(12) United States Patent
Egawa et al.

(10) Patent No.: US 7,733,402 B2
(45) Date of Patent: Jun. 8, 2010

(54) CMOS IMAGE SENSOR HAVING WIDE DYNAMIC RANGE

(75) Inventors: Yoshitaka Egawa, Yokohama (JP); Shinji Ohsawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 942 days.

(21) Appl. No.: 11/390,456

(22) Filed: Mar. 28, 2006

(65) Prior Publication Data
US 2006/0219866 A1    Oct. 5, 2006

(30) Foreign Application Priority Data
Mar. 31, 2005  (JP) .............................. 2005-104595

(51) Int. Cl.
*H04N 5/335* (2006.01)
(52) U.S. Cl. ..................... 348/308; 348/208.1; 348/300
(58) Field of Classification Search .... 348/207.99–376; 250/208.1
See application file for complete search history.

(56) References Cited

U.S. PATENT DOCUMENTS

| | | | |
|---|---|---|---|
| 4,825,291 A * | 4/1989 | Mimura et al. | 348/220.1 |
| 4,859,871 A * | 8/1989 | Kobayashi et al. | 327/333 |
| 5,499,058 A * | 3/1996 | Horng et al. | 348/642 |
| 6,677,569 B2 * | 1/2004 | Beusch | 250/208.1 |
| 6,930,722 B1 | 8/2005 | Nakamura et al. | |
| 6,947,087 B2 | 9/2005 | Egawa et al. | |
| 2001/0005227 A1 * | 6/2001 | Egawa et al. | 348/304 |
| 2003/0010895 A1 * | 1/2003 | Kimura et al. | 250/208.1 |
| 2003/0184530 A1 * | 10/2003 | Lin | 345/179 |
| 2004/0169753 A1 * | 9/2004 | Gulbransen et al. | 348/308 |
| 2004/0233312 A1 * | 11/2004 | Tay | 348/308 |
| 2004/0263673 A1 * | 12/2004 | Kikuchi et al. | 348/345 |
| 2005/0104985 A1 * | 5/2005 | Abe et al. | 348/308 |
| 2005/0195304 A1 * | 9/2005 | Nitta et al. | 348/308 |
| 2006/0177148 A1 * | 8/2006 | Sumiya et al. | 382/274 |
| 2009/0059048 A1 * | 3/2009 | Luo et al. | 348/308 |

(Continued)

FOREIGN PATENT DOCUMENTS

CN    1224973 A    8/1999

(Continued)

OTHER PUBLICATIONS

U.S. Appl. No. 11/553,233, filed Oct. 26, 2006, Egawa, et al.

(Continued)

*Primary Examiner*—Tuan Ho
*Assistant Examiner*—Kent Wang
(74) *Attorney, Agent, or Firm*—Oblon, Spivak, McClelland, Maier & Neustadt, L.L.P.

(57) ABSTRACT

A solid-state image sensing device includes a pixel unit, analog-to-digital converter, controller, and adder. In the pixel unit, cells are two-dimensionally arranged on a semiconductor substrate. An output analog signal from the pixel unit is converted into a digital signal by the analog-to-digital converter and output. The controller controls the pixel unit and analog-to-digital converter, and causes the analog-to-digital converter to digitize a plurality of analog signals different in storage time in the pixel unit during the storage period of the electric charge of one frame. The adder adds digital signals corresponding to the analog signals different in storage time and output from the analog-to-digital converter.

17 Claims, 21 Drawing Sheets

U.S. PATENT DOCUMENTS

2009/0185041 A1* 7/2009 Kang et al. ............... 348/208.1
2009/0231445 A1* 9/2009 Kanehiro ................. 348/208.2

FOREIGN PATENT DOCUMENTS

| CN | 1311533 A | | 9/2001 |
|---|---|---|---|
| JP | 9-247694 | | 9/1997 |
| JP | 11-155098 | | 6/1999 |
| JP | 11-155108 | | 6/1999 |
| JP | 11-266403 | * | 9/1999 |
| JP | 2000-23044 | | 1/2000 |
| JP | 2001-069408 | * | 3/2001 |
| JP | 2001-189893 | | 7/2001 |

OTHER PUBLICATIONS

U.S. Appl. No. 11/967,585, filed Dec. 31, 2007, Egawa, et al.

* cited by examiner

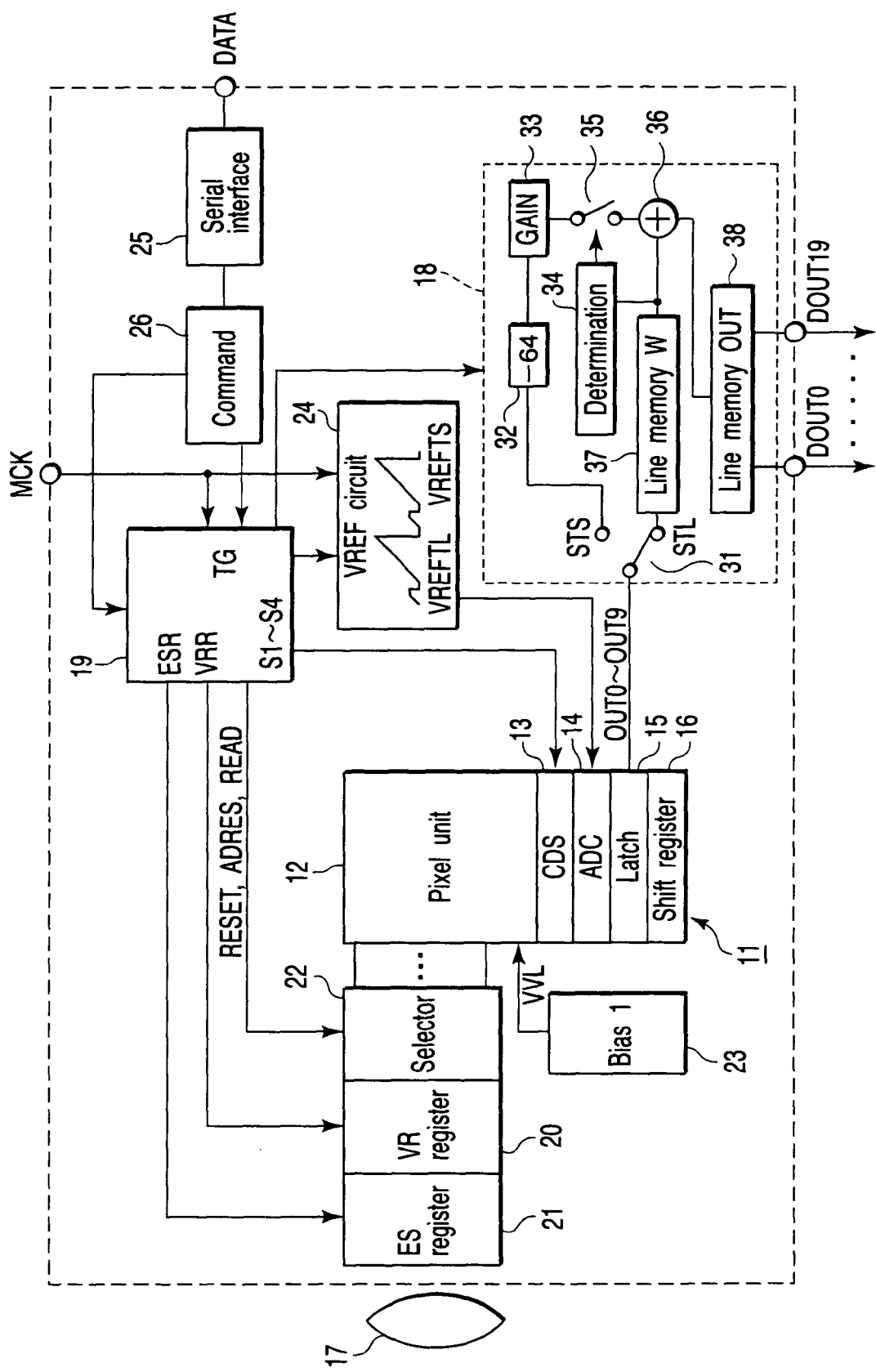
F I G. 1

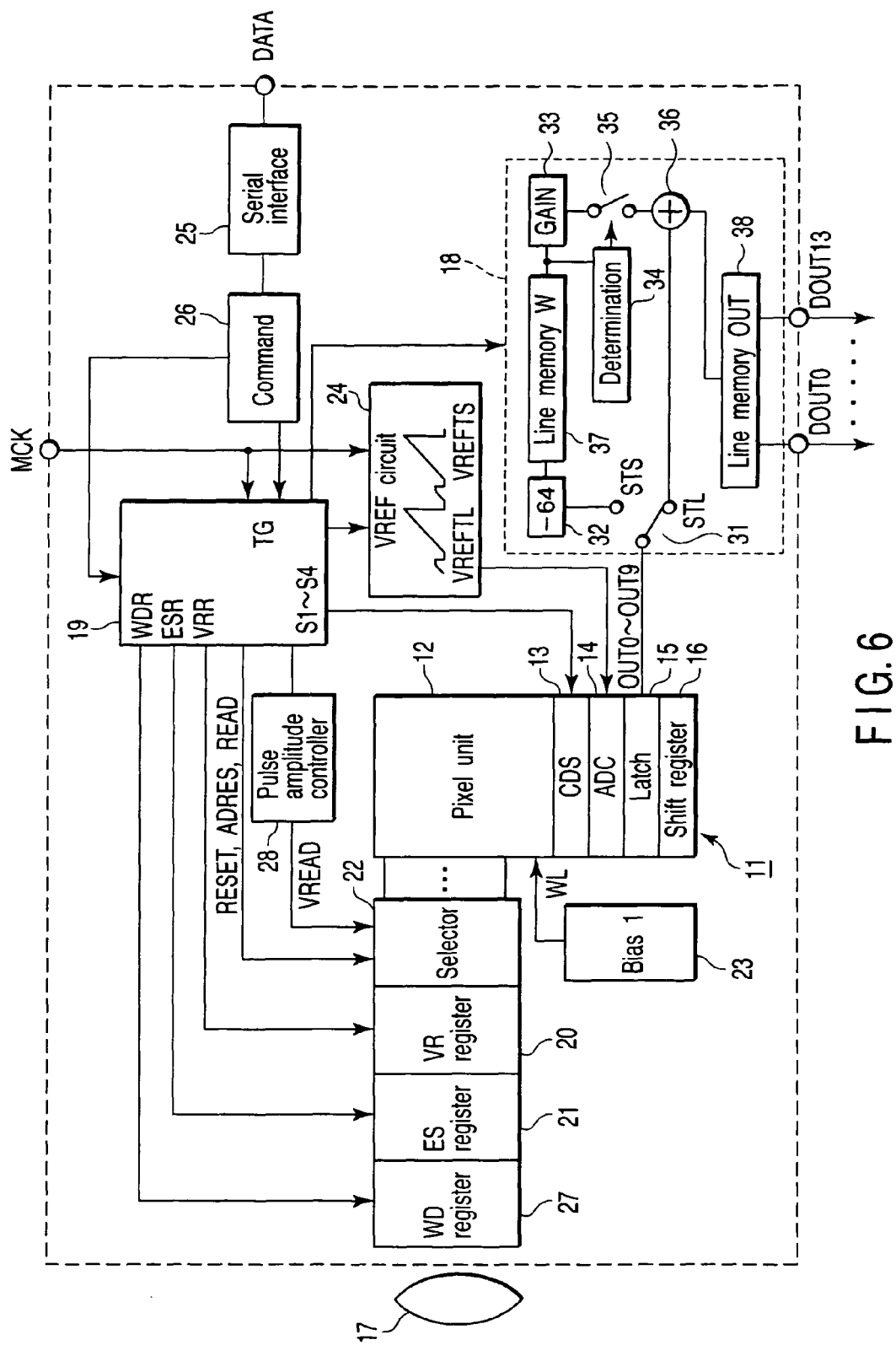
F I G. 6

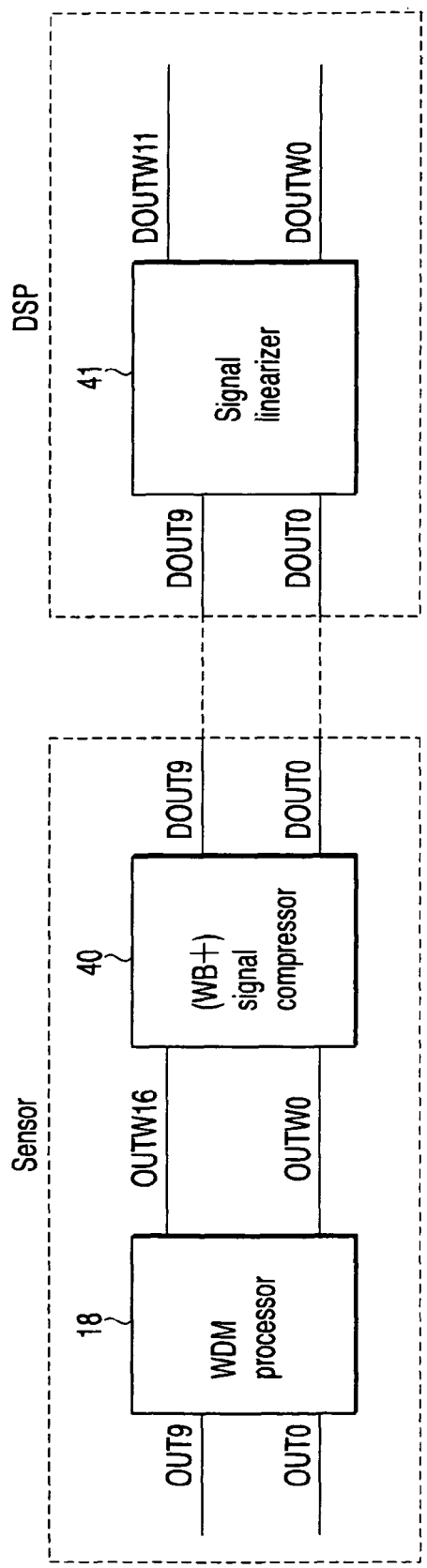
F I G. 20

CMOS IMAGE SENSOR HAVING WIDE DYNAMIC RANGE

CROSS-REFERENCE TO RELATED APPLICATIONS

This application is based upon and claims the benefit of priority from prior Japanese Patent Application No. 2005-104595, filed Mar. 31, 2005, the entire contents of which are incorporated herein by reference.

BACKGROUND OF THE INVENTION

1. Field of the Invention

The present invention relates to a solid-state image sensing device applied to a CMOS image sensor for use in, e.g., a cellphone with an image sensor, a digital camera, or a video camera.

2. Description of the Related Art

The conventional methods of increasing the dynamic range of a CMOS image sensor are proposed in, e.g., Jpn. Pat. Appln. KOKAI Publication No. 2001-189893 (Patent Publication 1 hereinafter) and Jpn. Pat. Appln. KOKAI Publication No. 2000-23044 (Patent Publication 2 hereinafter). The method of Patent Publication 1 is applied to an incomplete transfer type photodiode and may produce afterimages or white defects, so the image quality is difficult to improve. By contrast, the method of Patent Publication 2 corresponds to a complete transfer type, so neither afterimages nor white defects form unlike in Patent Publication 1. However, since the dynamic range is increased by using a detector, the leak from this detector may produce dark nonuniformity or KTC noise and degrade the image quality by factors different from those in Patent Publication 1. In addition, both the methods add a long-storage-time signal and short-storage-time signal and output the sum. This makes it difficult to separate the long-storage-time signal and short-storage-time signal.

BRIEF SUMMARY OF THE INVENTION

A solid-state image sensing device according to an aspect of the present invention comprising a pixel unit in which cells each including photoelectric converting means for storing an electric charge obtained by photoelectrically converting incident light, reading means for reading out the electric charge stored in the photoelectric converting means to a detection node, amplifying means for amplifying the electric charge read out to the detection node and outputting the amplified electric charge, and resetting means for resetting the detection node are two-dimensionally arranged on a semiconductor substrate, an analog-to-digital converter configured to convert an output analog signal from the amplifying means into a digital signal, and output the digital signal, a controller configured to control the pixel unit and the analog-to-digital converter, and cause the analog-to-digital converter to digitize a plurality of analog signals different in storage time during a storage period of an electric charge of one frame, and an adder configured to add digital signals corresponding to said plurality of analog signals different in storage time and output from the analog-to-digital converter.

BRIEF DESCRIPTION OF THE SEVERAL VIEWS OF THE DRAWING

FIG. 1 is a block diagram for explaining a solid-state image sensing device according to the first embodiment of the present invention, in which an outline of the arrangement of an amplification type CMOS image sensor is illustrated;

FIG. 6 is a block diagram for explaining a solid-state image sensing device according to the third embodiment of the present invention, in which an outline of the arrangement of an amplification type CMOS image sensor is illustrated;

FIG. 20 is a view for explaining a solid-state image sensing device according to the eighth embodiment of the present invention, in which the signal processing configuration of an amplification type CMOS image sensor is illustrated;

DETAILED DESCRIPTION OF THE INVENTION

First Embodiment

Figure 2:
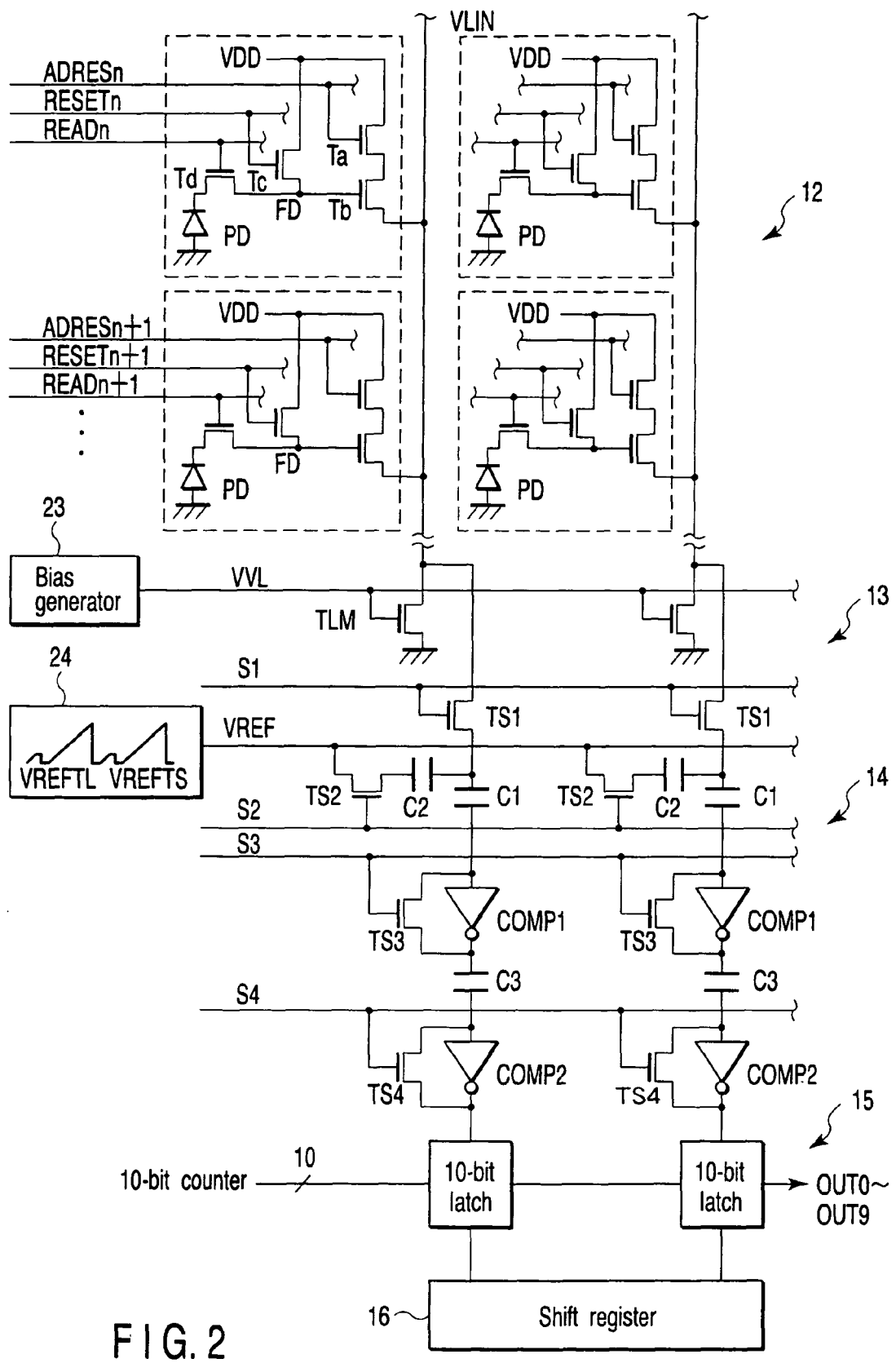
FIG. 2 is a circuit diagram showing practical arrangements of a pixel unit, CDS, and ADC in the amplification type CMOS image sensor shown in FIG. 1.

FIG. 1 is a block diagram for explaining a solid-state image sensing device according to the first embodiment of the present invention, in which an outline of the arrangement of an amplification type CMOS image sensor is illustrated. A sensor core 11 includes a pixel unit (or a pixel section) 12, column type noise canceller (CDS) 13, column type analog-to-digital converter (ADC) 14, latch circuit 15, and horizontal shift register 16. Light enters the pixel unit 12 through a lens 17, and an electric charge corresponding to the incident light amount is generated by photoelectric conversion. An analog signal corresponding to the generated electric charge is supplied to the ADC 14 via the CDS 13 and converted into a digital signal, and this digital signal is latched by the latch circuit 15. The digital signal latched by the latch circuit 15 is sequentially transferred to the shift register 16 and read out. Digital signals OUT0 to OUT9 read out from the shift register 16 are supplied to a wide dynamic range mixer (WDM) circuit 18.

A vertical register (VR register) 20 for signal read, a vertical register (ES register, a register for controlling a long storage time) 21 for controlling the storage time, and a pulse selector (selector) 22 are arranged adjacent to the pixel unit 12.

Data read from the pixel unit 12 and control of the CDS 13 are performed by pulse signals S1 to S4, ESR, VRR, RESET, ADRES, and READ output from a timing generator (TG) 19. The pulse signals S1 to S4 are supplied to the CDS 13, the pulse signal ESR is supplied to the ES register 21, the pulse signal VRR is supplied to the VR register 20, and the pulse signals RESET, ADRES, and READ are supplied to the pulse selector 22. The registers 21 and 20 select vertical lines of the pixel unit 12. The pulse signals RESET, ADRES, and READ are supplied to the pixel unit 12 via the pulse selector 22. A bias generator (bias 1) 23 applies a bias voltage VVL to the pixel unit 12.

A VREF generator 24 operates in response to a main clock signal MCK, and generates a reference waveform for A/D conversion (ADC). The amplitude of this reference waveform is controlled by data DATA input to a serial interface 25. A command input to the serial interface 25 is supplied to a command decoder 26 where the command is decoded, and the decoded command is supplied together with the main clock signal MCK to the timing generator 19. The VREF generator 24 generates triangular waves VREFTL and VREFTS and supplies them to the ADC 14, in order to execute digitization twice in one horizontal scanning period.

The WDM circuit 18 includes a switch 31, a subtracter 32 for subtracting 64 LSB of a no-signal level (OB level), a gain (GAIN) circuit 33 for amplifying the output from the subtracter 32, a determination circuit 34, a switch 35, an adder 36, a line memory W 37, and a line memory (line memory OUT) 38 for 20-bit speed conversion. When the output digital signals OUT0 to OUT9 from the latch circuit 15 are input to the WDM circuit 18, they are input to the line memory W 37 if a signal STL indicating a long storage time is input to the switch 31.

On the other hand, if a signal STS indicating a short storage time is input to the switch 31, the subtracter 32 subtracts 64 LSB of the no-signal level (OB level), and the gain circuit 33 amplifies the output. In this embodiment, the signals OUT0 to OUT9 when the storage time is long are clipped with 1024 LSB, so they can be smoothly synthesized with the signals OUT0 to OUT9 when the storage time is short.

The output from the line memory W 37 is input to the adder 36 and determination circuit 34. If the determination circuit 34 determines that the output from the line memory W 37 has saturated with 1023 LSB, the switch 35 is turned on to input the amplified signal STS to the adder 36 where the signal STS is added to the signal STL. The sum is input to the line memory OUT 38 and output from the sensor at a low speed of ½.

FIG. 2 is a circuit diagram showing practical arrangements of the pixel unit 12, CDS 13, and ADC 14 in the amplification type CMOS image sensor shown in FIG. 1.

Each cell (pixel) in the pixel unit 12 includes four transistors (a row select transistor Ta, amplification transistor Tb, reset transistor Tc, and read transistor Td), and a photodiode (photoelectric converting means) PD. The current paths of the transistors Ta and Tb are connected in series between a power supply VDD and vertical signal line VLIN. A pulse signal ADRESn is supplied to the gate of the transistor Ta. The current path of the transistor Tc is connected between the power supply VDD and the gate (a detection node FD) of the transistor Tb. A pulse signal RESETn is supplied to the gate of the transistor Tc. One end of the current path of the transistor Td is connected to the detection node FD, and a pulse signal (read pulse) READn is supplied to the gate of the transistor Td. The cathode of the photodiode PD is connected to the other end of the current path of the transistor Td, and the anode of the photodiode PD is grounded.

The pixel unit 12 is formed by two-dimensionally arranging the cells having the above configuration into rows and columns. In the lower portion of the pixel unit 12, load transistors TLM for a source follower circuit are horizontally arranged. The current paths of the load transistors TLM are connected between the vertical signal lines VLIN and ground points. The bias voltage VVL is applied from the bias generator 23 to the gates of the load transistors TLM. The CDS 13 and ADC 14 include capacitors C1 and C2 for the noise canceller, transistors TS1 for transmitting signals from the vertical signal lines VLIN, transistors TS2 for receiving the reference waveform for digitization, and two-stage comparators COMP1 and COMP2. Capacitors C3 are connected between the comparators COMP1 and COMP2. The comparator COMP1 includes an inverter INV1, and a transistor TS3 having a current path connected between the input and output terminals of the inverter INV1. The comparator COMP2 includes an inverter INV2, and a transistor TS4 having a current path connected between the input and output terminals of the inverter INV2. The pulse signals S1, S2, S3, and S4 output from the timing generator 19 are respectively supplied to the gates of the transistors TS1, TS2, TS3, and TS4. The output digital signal from the comparator COMP2 is latched by the latch circuit 15, and sequentially read out by the shift register 16. In this manner, the latch circuit 15 outputs the 10-bit digital signals OUT0 to OUT9.

To read out a signal of, e.g., the nth one of the vertical signal lines VLIN in the above arrangement, the source follower circuit made up of the amplification transistor Tb and load transistor TLM is operated by changing the pulse signal ADRESn to "H" level. A signal charge obtained by photoelectric conversion by the photodiode PD is stored for a predetermined period. To remove a noise signal such as a dark current from the detection node FD before data read, the pulse signal RESETn is set at "H" level to turn on the transistor Tc, thereby setting the detection node FD at VDD voltage=2.8 V. Consequently, a voltage (reset level) when the detection node FD as a reference has no signal is output to the vertical signal line VLIN. In this case, the pulse signals S1, S3, and S4 are changed to "H" level to respectively turn on the transistors TS1, TS3, and TS4, thereby setting the digitization levels of the comparators COMP1 and COMP2 in the ADC 14, and storing, in the capacitor C1, an electric charge in an amount corresponding to the reset level of the vertical signal line VLIN.

Then, the pulse signal (read pulse) READn is changed to "H" level to turn on the read transistor Td, and the signal charge generated and stored by the photodiode PD is read out to the detection node FD. In this manner, the voltage (signal+ reset) level of the detection node FD is read out to the vertical signal line VLIN. In this case, the transistor TS1 is turned on by changing the pulse signal S1 to "H" level, the transistor TS3 is turned off by changing the pulse signal S3 to "L" level, the transistor TS4 is turned off by changing the pulse signal S4 to "L" level, and the transistor TS2 is turned on by changing the pulse signal S2 to "H" level, so an electric charge corresponding to "the signal of the vertical signal line VLIN+ the reset level" is stored in the capacitor C2. In this state, the reset level is held in the capacitor C1 because the input terminal of the comparator COMP1 has high impedance.

After that, the level of the reference waveform output from the VREF generator 24 is increased (the triangular wave VREF is raised from low level to high level), thereby performing digitization by the comparators COMP1 and COMP2 via the synthetic capacitance of the capacitors C1 and C2. A 10-bit counter determines 10-bit digitization levels (0 to 1,023 levels) of the triangular wave. Since the reset level stored in the capacitor C1 has polarity opposite to that of the reset level stored in the capacitor C2, the reset level is canceled, and digitization is practically executed by the signal component of the capacitor C2. This operation of removing the reset level is called a noise reducing operation (CDS: Correlated Double Sampling). To execute this digitization twice in one horizontal scanning period, the VREF generator 24 generates the triangular waves VREFTL and VREFTS, and supplies them to one end of the current path of the transistor TS2.

Figure 3:
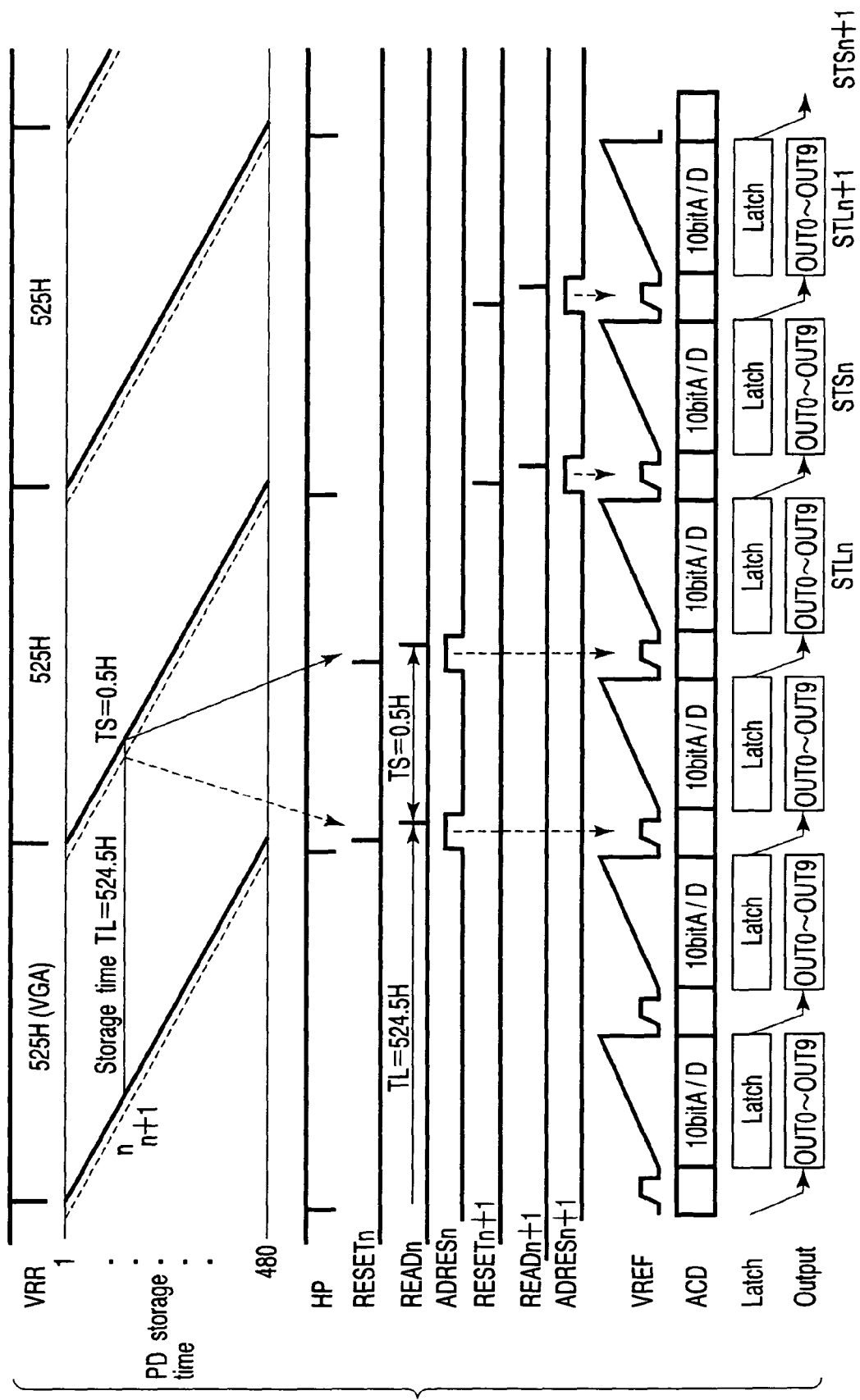
FIG. 3 is a timing chart showing the operation timings of the CMOS image sensor shown in FIGS. 1 and 2.

FIG. 3 is a timing chart showing the operation timings of the CMOS image sensor shown in FIGS. 1 and 2. In a VGA sensor, one frame is driven at 30 Hz with the number of horizontal scanning lines being 525 H. For the nth vertical line, a storage time TL for storing an electric charge generated by photoelectric conversion by the photodiode PD is TL=524.5 H. The pulse signals RESETn, READn, and ADRESn are supplied to the pixel unit 12 in synchronism with a horizontal sync pulse HP, and a signal charge amount obtained by photoelectric conversion by the photodiode PD and stored in the detection node FD is detected and read out. To turn on the reset transistor Tc by changing the pulse signal RESETn to "H" level and then turn off the reset transistor Tc to load the reset level, the signal is read out by setting the amplitude of the reference waveform at an intermediate level. This intermediate level is automatically adjusted in the sensor such that a light-shielding pixel (OB) portion formed in the pixel unit 12 has 64 LSB. Then, the pulse signal READn is changed to "H" level to turn on the transistor Td, thereby reading out the signal. With respect to this readout signal, a triangular wave is generated as the reference waveform to perform 10-bit digitization in a 0.5 H period as the first half of the horizontal scanning period. The A/D-converted signal (digital data) is held in the latch circuit 15, and output as a switching signal STLn from the sensor core 11 in a 0.5 H period as the second half of the horizontal scanning period.

The signal is read out from the photodiode PD after storage time TL=524.5 H, and a signal charge is stored in the photodiode PD again by photoelectric conversion. After the photodiode PD stores the electric charge for a period of TS=0.5 H, the pulse signals RESETn, READn, and ADRESn are supplied to the pixel unit 12 to perform photoelectric conversion by the photodiode PD and read out the stored signal charge, in the same manner as in the first time. To turn on the reset transistor Tc by changing the pulse signal RESETn to "H" level and then turn off the reset transistor Tc to load the reset level, the signal is read out by setting the amplitude of the reference waveform at an intermediate level. This intermediate level is automatically adjusted in the sensor such that the light-shielding pixel (OB) portion of the pixel unit 12 has 64 LSB. Then, the pulse signal READn is changed to "H" level to turn on the transistor Td, thereby reading out the signal. With respect to this readout signal, a triangular wave is generated as the reference waveform to perform 10-bit digitization in a 0.5 H period as the second half of the horizontal scanning period. The digitized signal (digital data) is held in the latch circuit 15, and output as a switching signal STSn from the sensor core 11 in a 0.5 H period as the first half of the next horizontal scanning period.

As shown in FIG. 1, the switching signals STLn and STSn output from the sensor core 11 are supplied to the wide dynamic range mixer (WDM) circuit 18. The signal STLn is input to the line memory W 37. The signal STSn is amplified by the gain circuit 33, and added to the output from the line memory W 37 which lags behind by one line. The sum signal is input to the line memory OUT 38 and read out at a low speed of ½, thereby outputting data from the sensor in one horizontal scanning period. The gain of the WDM circuit 18 is set by adjusting the gain multiplier of the signal STSn so that the sum signal (STLn+STSn) is linear in accordance with the incident light amount. Since the gain is normally calculated by the storage time ratio, it is 524.5/0.5=×1,049 in the above setting. This sensor output signal is output as a 20-bit (DOUT0 to DOUT19) signal by addition.

Note that storage time TL=524.5 H can be shortened by operating the ES register 21 in the circuit shown in FIG. 1. The storage time TL is not limited to the above example and can be freely changed. In this case, the gain coefficient of the signal STS of the WDM circuit 18 is changed in accordance with the ratio of the storage time TL to the storage time TS.

With the arrangement as described above, the dynamic range can be widened without deteriorating the image quality by separately digitizing a long-storage-time signal and short-storage-time signal and adding the two readout digital signals in one horizontal scanning period.

Second Embodiment

As a solid-state image sensing device according to the second embodiment of the present invention, an example in which the storage time TS in the timing chart shown in FIG. 3 is 1 H or more will be explained below.

Figure 4:
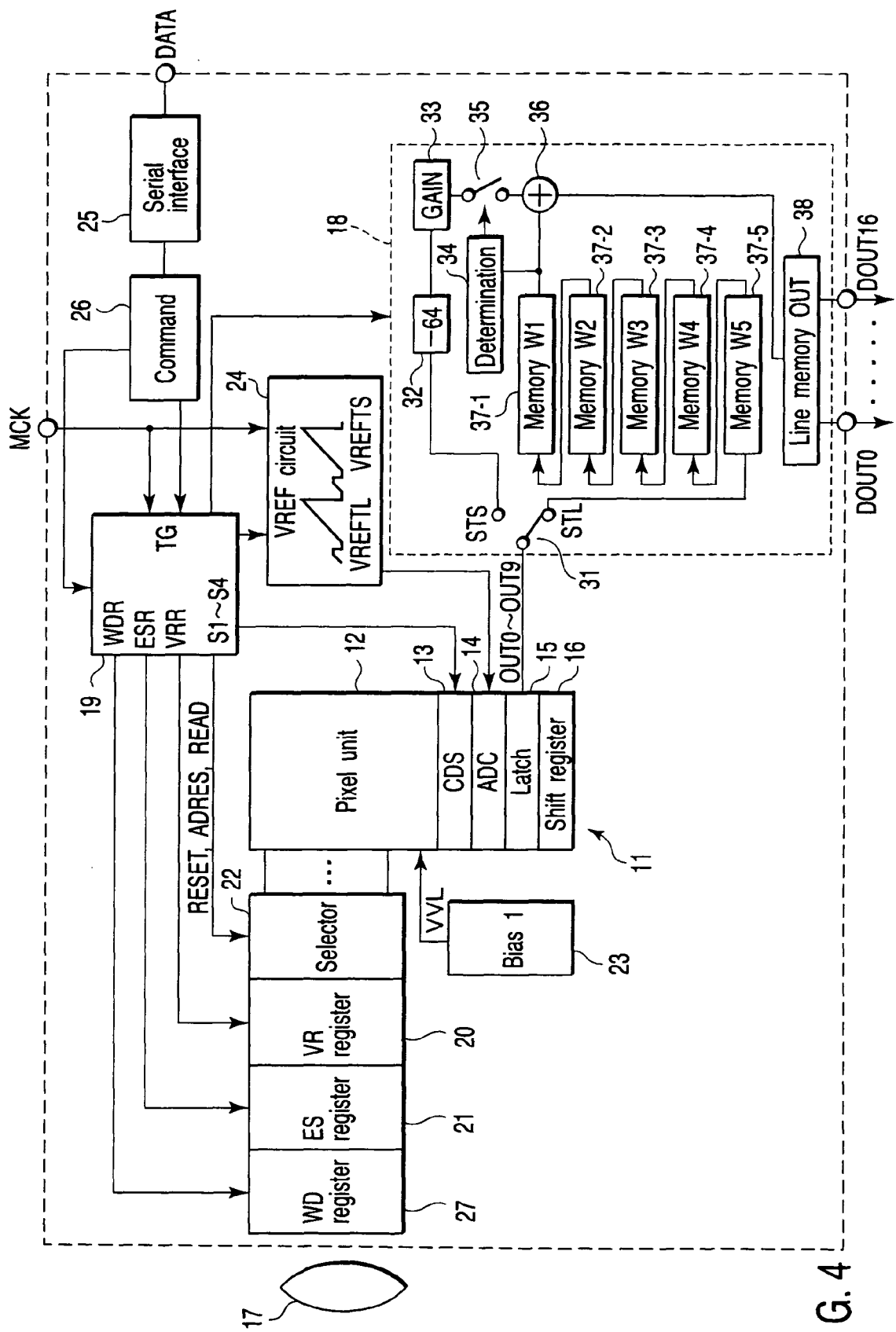
FIG. 4 is a block diagram for explaining a solid-state image sensing device according to the second embodiment of the present invention, in which an outline of the arrangement of an amplification type CMOS image sensor is illustrated.

FIG. 4 is a block diagram for explaining the solid-state image sensing device according to the second embodiment of the present invention, in which an outline of the arrangement of an amplification type CMOS image sensor is illustrated. This circuit shown in FIG. 4 differs from that shown in FIG. 1 in that a vertical register (WD register, a register for controlling a short storage time) 27 for data read from a pixel unit 12 is formed. In addition, a WDM circuit 18 has five line memories W (line memories W1 to W5: 37-1 to 37-5). The output signal of this sensor has 17 bits (DOUT0 to DOUT16).

The rest of the basic configuration is the same as the circuit shown in FIG. 1, so the same reference numerals denote the same parts, and a detailed explanation thereof will be omitted.

Figure 5:
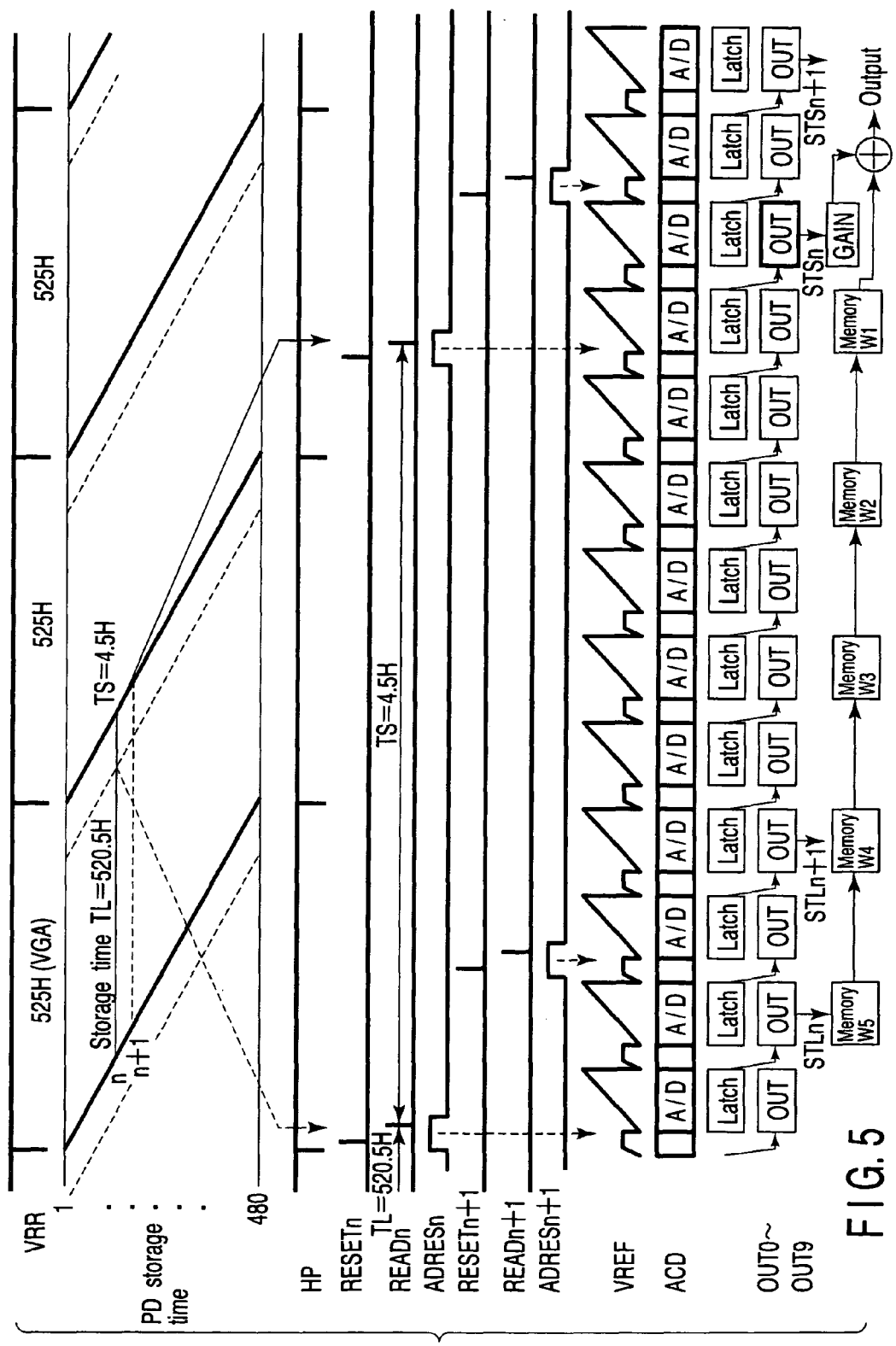
FIG. 5 is a timing chart showing the operation timings of the CMOS image sensor shown in FIG. 4.

FIG. 5 is a timing chart showing the operation timings of the CMOS image sensor shown in FIG. 4. In this example, a storage time TL for storing an electric charge generated by photoelectric conversion by a photodiode PD of the nth vertical line is TL=520.5 H. Pulse signals RESETn, READn, and ADRESn are supplied to the pixel unit 12 in synchronism with a horizontal sync pulse HP, and a signal charge photoelectrically converted by the photodiode PD and stored in a detection node FD is read out. To turn on a reset transistor Tc by changing the pulse signal RESETn to "H" level and then turn off the reset transistor Tc to load the reset level, the signal is read out by setting the amplitude of a reference waveform at an intermediate level. This intermediate level is automatically adjusted in the sensor such that a light-shielding pixel (OB) portion of the pixel unit 12 has 64 LSB. Then, the pulse signal READn is changed to "H" level to turn on a transistor Td, thereby reading out the signal. With respect to this readout signal, a triangular waveform is generated as the reference waveform to perform 10-bit digitization in a 0.5 H period as the first half of a horizontal scanning period. The digitized signal (digital data) is held in a latch circuit 15, and output as a switching signal STLn from a sensor core 11 and input to the line memory 37-5 in a 0.5 H period as the second half of the horizontal scanning period.

The signal is read out from the photodiode PD after storage time TL=520.5 H, and a signal charge is stored in the photodiode PD again by photoelectric conversion. After the photodiode PD stores the electric charge for a period of TS=4.5 H, the pulse signals RESETn, READn, and ADRESn are supplied to the pixel unit 12 to perform photoelectric conversion by the photodiode PD and read out the stored signal charge, in the same manner as in the first time. To turn on the reset transistor Tc by changing the pulse signal RESETn to "H" level and then turn off the reset transistor Tc to load the reset level, the signal is read out by setting the amplitude of the reference waveform at an intermediate level. This intermediate level is automatically adjusted in the sensor such that the light-shielding pixel (OB) portion of the pixel unit 12 has 64 LSB. Then, the pulse signal READn is changed to "H" level to turn on the transistor Td, thereby reading out the signal. With respect to this readout signal, a triangular wave is generated as the reference waveform to perform 10-bit A/D conversion in a 0.5 H period as the second half of the horizontal scanning period. The digitized signal (digital data) is held in the latch circuit 15, and output as a signal STSn from the sensor core 11 in a 0.5 H period as the first half of the next horizontal scanning period.

The signal STLn output from the sensor core 11 is sequentially transferred to the line memories 37-5, 37-4, 37-3, 37-2, and 37-1 of the wide dynamic range mixer (WDM) circuit 18, and delayed by a period of 5 H. An adder 36 adds the delayed signal and the amplified (gained) signal STSn. As shown in FIG. 4, the sum signal is input to a line memory OUT 38 where speed conversion is performed, and output at a low speed of ½, thereby outputting data in one horizontal scanning period. The gain of the WDM circuit 18 is set by adjusting the gain multiplier of the signal STSn so that the sum signal (STLn+STSn) is linear in accordance with the received light amount. Since the gain is normally calculated by the storage time ratio, it is 520.5/4.5=×115 in the above setting. In this embodiment, the sensor output signal is output as a 17-bit (DOUT0 to DOUT16) signal.

Charge storage time TL=520.5 H described above can be shortened by operating an ES register 21 shown in FIG. 4. Also, storage time TS=4.5 H can be changed by controlling a WD register 27. In this case, the gain coefficient of the signal STS is changed in accordance with the ratio of the storage time TL to the storage time TS. Furthermore, to extend the storage time TS, the number of line memories is increased; to shorten the storage time TS, the number of line memories is decreased.

In the solid-state image sensing devices according to the first and second embodiments as described above, the dynamic range can be widened without deteriorating the image quality by using a small number of line memories, a multiplier as a circuit for amplifying a digital signal, and an adder for adding two signals. Also, since the output signal of the sensor is a digital signal, an output signal frequency equal to that of the conventional sensor can be obtained by converting the speed by the line memory and outputting the signal from the sensor. In addition, the amplitude of the reference waveform VREFTL differs from that of the reference waveform VREFTS. When the signal STS is to be A/D-converted, therefore, the signal can be amplified in an analog manner by decreasing the amplitude of the VREFTS. Since this decreases the digital gain, the quantization error can be reduced. Furthermore, the output signal from the line memory W 37 is a digital output, 1023 LSB need only be determined. Since an analog signal is determined at a predetermined level or more, the continuity of signals is low when they are added. However, this embodiment can improve the signal continuity.

Third Embodiment

As a solid-state image sensing device according to the third embodiment of the present invention, an example in which the storage time TS is set at 1 H or more without increasing the number of line memories will be explained below.

FIG. 6 is a block diagram for explaining the solid-state image sensing device according to the third embodiment of the present invention, in which an outline of the arrangement of an amplification type CMOS image sensor is illustrated. The circuit shown in FIG. 6 differs from that shown in FIG. 4 in that a pulse amplitude controller 28 for controlling the amplitude of a pixel driving pulse is applied to a pulse signal VREAD. Also, when a signal STL is input to a WDM circuit 18, output signals OUT0 to OUT9 of a latch circuit 15 are input to an adder 36. When a signal STS is input, this signal is input to a line memory W 37 after −64 LSB processing. The output signal from the line memory W 37 is input to a gain circuit 33 and determination circuit 34. If the determination circuit 34 determines that the output from the line memory W 37 is not 0 LSB but a signal, a switch 35 is turned on to input the signal STS amplified by the gain circuit 33 to the adder 36 where the signal STS is added to the signal STL. The output sum is input to a 14-bit line memory OUT 38 and output from the sensor at a low speed of ½ (output signals OUT0 to OUT13).

Figure 7:
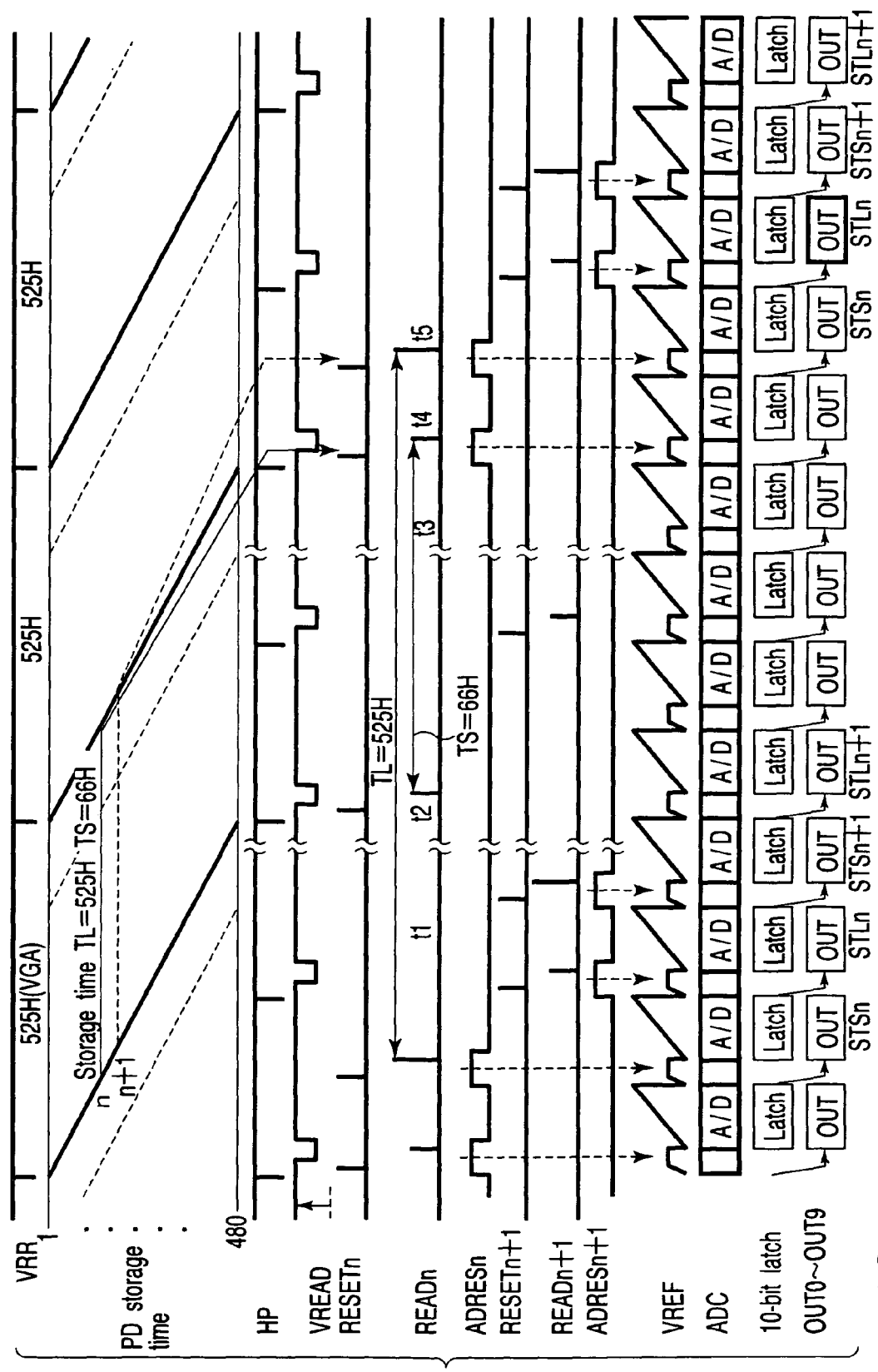
FIG. 7 is a timing chart showing the operation timings of the CMOS image sensor shown in FIG. 6.

FIG. 7 is a timing chart showing the operation timings of the CMOS image sensor shown in FIG. 6. In this embodiment, a storage time TL for storing an electric charge generated by photoelectric conversion by a photodiode PD of the nth vertical line is TL=525 H. Also, short storage time TS=66 H. The long storage time TL is controlled by setting the amplitude of a read pulse READ at high level (2.8 V). The short storage time TS is controlled by setting the amplitude of the read pulse READ at low level=1 V. To generate the read pulse READ, the pulse amplitude controller 28 controls the amplitude of the read pulse READ. The storage time TL can be controlled for every 1 H by an ES register 21. The storage time TS can be controlled for every 1 H by a WD register 27.

In a first read operation (t4) from the photodiode PD, pulse signals RESETn, READn, and ADRESn are supplied to a pixel unit 12 in synchronism with a horizontal sync pulse HP to read out a signal charge photoelectrically converted and stored by the photodiode PD. In this case, the amplitude of the read pulse READ is set at low level. As the signal charge to be read out for the first time, a partial signal charge of the photodiode PD is read out and output by inputting the read pulse READ at low level at time t2 during a storage time of 525 H. A signal stored from time t2 to time t4 is read out from the photodiode PD at time t4.

To turn on a reset transistor Tc by changing the pulse signal RESETn to "H" level and then turn off the reset transistor Tc to load the reset level, the signal is read out by setting the amplitude of a reference waveform at an intermediate level. This intermediate level is automatically adjusted in the sensor such that a light-shielding pixel (OB) portion of the pixel unit 12 has 64 LSB. Then, the pulse signal READn is changed to "H" level to turn on a read transistor Td, thereby reading out the signal. With respect to this readout signal, a triangular wave is generated as the reference waveform to perform 10-bit digitization in a 0.5 H period as the first half of a horizontal scanning period. The digitized signal (digital data) is held in the latch circuit 15, and output as a switching signal STSn from a sensor core 11 and input to the line memory W 37 in a 0.5 H period as the second half of the horizontal scanning period.

In a second read operation (t5) from the photodiode PD, the pulse signals RESETn, READn, and ADRESn are supplied to the pixel unit 12 after the first 0.5 H to read out a signal charge photoelectrically converted and stored by the photodiode PD. In this case, the amplitude of the read pulse READ is set at high level.

The signal charge photoelectrically converted and stored by the photodiode PD and having storage time TL=525 H is read out by inputting the pulse signals RESETn, READn, and ADRESn in the same manner as in the first time. To turn on the reset transistor Tc by changing the pulse signal RESETn to "H" level and then turn off the reset transistor Tc to load the reset level, the signal is read out by setting the amplitude of the reference waveform at an intermediate level. This intermediate level is automatically adjusted in the sensor such that the light-shielding pixel (OB) portion of the pixel unit 12 has 64 LSB. Then, the pulse signal READn is changed to "H" level to turn on the read transistor Td, thereby reading out the signal. With respect to this readout signal, a triangular wave is generated as the reference waveform to perform 10-bit digitization in a 0.5 H period as the second half of the horizontal scanning period. The digitized signal is held in the latch circuit 15, and output as a switching signal STLn from the sensor core 11 in a 0.5 H period as the first half of the next horizontal scanning period.

As shown in FIG. 6, the output switch signal STSn is delayed by 1 H by the line memory W 37 of the wide dynamic range mixer (WDM) circuit 18, amplified (gained), and added to the signal STLn. The sum signal is input to the line memory OUT 38 where speed conversion is performed, and output at a low speed of ½, thereby outputting data in one horizontal scanning period. The gain of the WDM circuit 18 is set by adjusting the gain multiplier of the signal STSn so that the sum signal (STLn+STSn) is linear in accordance with the light amount. Since the gain is normally calculated by the storage time ratio, it is 525/66=×8 in the above setting. The sensor output signal is output as a 14-bit (DOUT0 to DOUT13) signal.

Figure 8A:
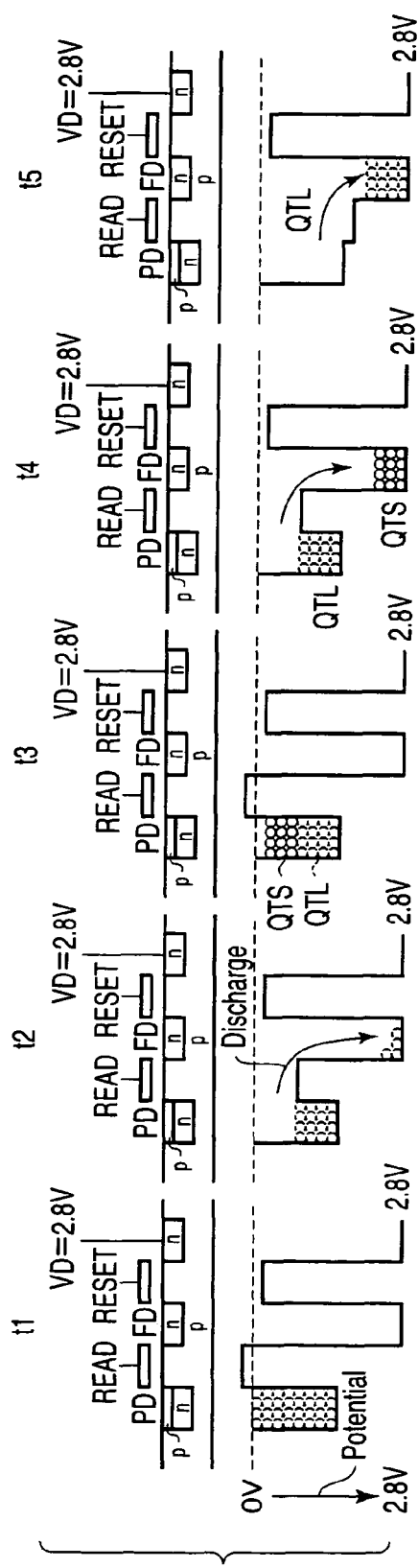
FIG. 8A shows a sectional view and potential diagram of a pixel unit when a large signal is to be stored at times t1 to t5 shown in the operation timing chart of FIG. 7.
Figure 8B:
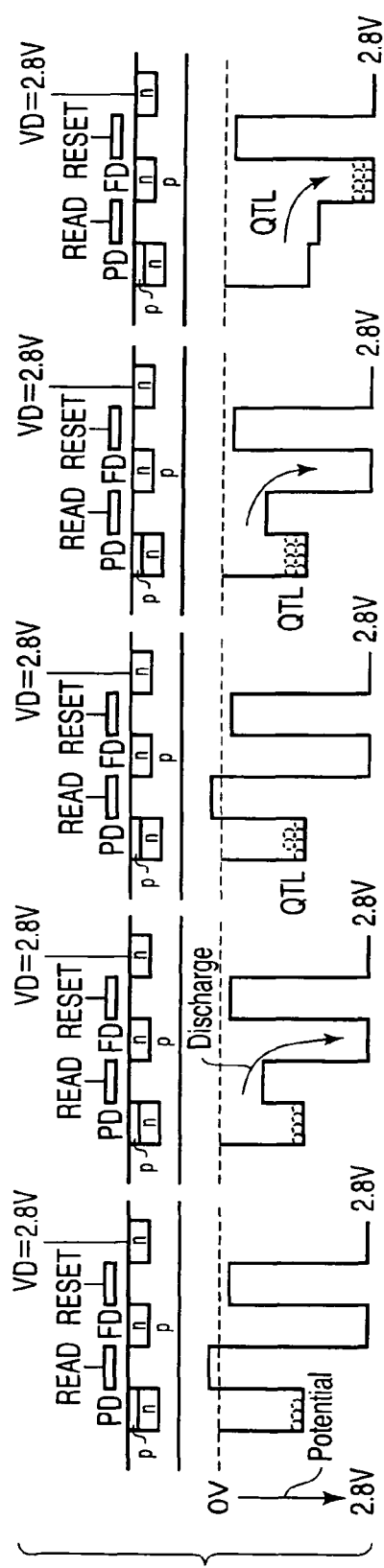
FIG. 8B shows a sectional view and potential diagram of the pixel unit when a small signal is to be stored at times t1 to t5 shown in the operation timing chart of FIG. 7.

FIGS. 8A and 8B are sectional views and potential diagrams of a pixel unit at times t1 to t5 in the operation timing chart shown in FIG. 7. That is, FIG. 8A shows a sectional view and potential diagram when a large signal is to be stored, and FIG. 8B shows a sectional view and potential diagram when a small signal is to be stored.

A photodiode PD is formed by an n-type impurity diffusion region formed in a p-type semiconductor substrate, and the surface of this n-type impurity diffusion region is shielded by a p-type impurity diffusion region. In this manner, a buried photodiode PD having small defects or a small dark nonuniformity is formed. A detection node FD is formed by an n-type impurity diffusion region, and functions together with the n-type impurity diffusion region of the photodiode PD as source and drain regions of a read transistor (read gate) Td. A gate electrode made of polysilicon is formed on a gate insulating film (not shown) formed on the substrate between these n-type impurity diffusion regions. A read pulse READ is supplied to this gate electrode. An n-type impurity diffusion region is formed adjacent to the n-type impurity diffusion region as the detection node FD. This n-type impurity diffusion region functions as a drain region of a reset transistor (reset gate) Tc, and the n-type impurity diffusion region of the detection node FD functions as a source region. A drain voltage VD (=2.8 V, e.g., VDD) is applied to the drain region. A gate electrode made of polysilicon is formed on a gate insulating film (not shown) formed on the substrate between these n-type impurity diffusion regions. A reset pulse RESET is supplied to this gate electrode. The detection node FD can be reset to the drain voltage VD by the reset transistor Tc.

When a large signal is to be stored, as shown in FIG. 8A, a signal charge of the photodiode PD saturates at time t1. At time t2, a low-level read voltage (=1.5 V) is applied to the read gate to remove a portion of the signal charge having saturated in the photodiode PD. At time t3, a signal is stored in the photodiode PD again. At time t4, this signal stored in the photodiode PD is read out to the detection node FD by applying the low-level read voltage (=1.5 V). At time t5, the residual signal charge in the photodiode PD is read out to the detection node FD by applying a high-level read voltage (=2.8 V). That is, if the photodiode PD saturates, a short-storage-time signal can be read out at time t4.

By contrast, when a small signal is to be stored, as shown in FIG. 8B, a signal charge in the photodiode PD has not saturated at time t1. At time t2, the read gate is opened by the low-level read voltage (=1.5 V), but the signal charge is not removed from the photodiode PD because this signal charge has not saturated. At time t3, the signal charge is kept stored in the photodiode PD. At time t4, the low-level read voltage (=1.5 V) is applied to read out the signal charge from the photodiode PD. However, the signal charge in the photodiode PD is not read out to the detection node FD because the amount of signal charge is small. At time t5, the whole signal charge in the photodiode PD is read out to the detection node FD by applying the high-level read voltage (=2.8 V).

Figure 9A:
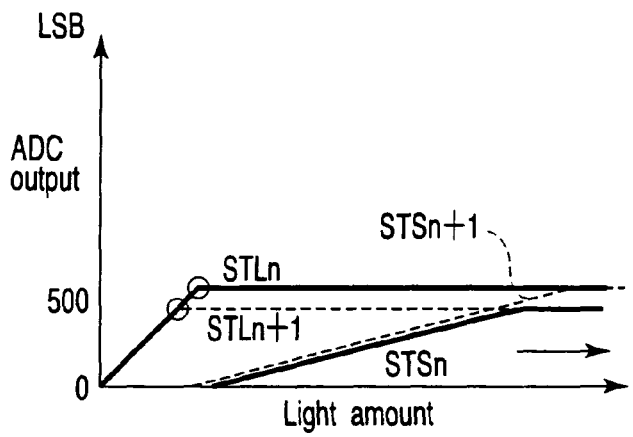
FIG. 9A is a graph for explaining the operation of a WDM circuit in the solid-state image sensing device according to the third embodiment of the present invention, in which the relationship between the ADC output and light amount is illustrated.
Figure 9B:
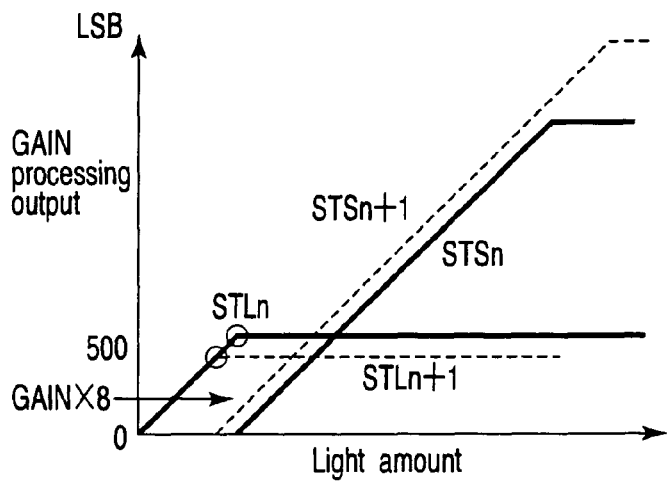
FIG. 9B is a graph for explaining the operation of the WDM circuit in the solid-state image sensing device according to the third embodiment of the present invention, in which the relationship between the gain processing output and light amount is illustrated.
Figure 9C:
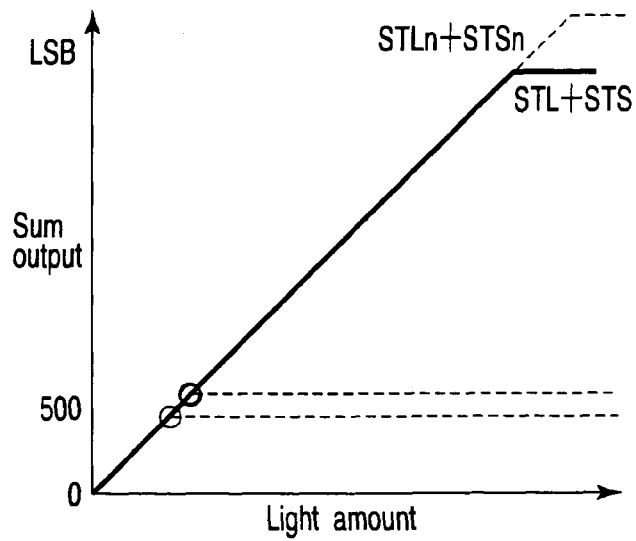
FIG. 9C is a graph for explaining the operation of the WDM circuit in the solid-state image sensing device according to the third embodiment of the present invention, in which the relationship between the sum output and light amount is illustrated.

FIGS. 9A to 9C each show the operation of the WDM circuit 18. FIG. 9A shows an ADC output signal, in which the abscissa indicates the light amount, and the ordinate the ADC output level. First, a signal STL increases in proportion to the light amount up to the saturation signal in the photodiode PD which is limited by the low-level read voltage. This saturation is so set that the photodiode PD saturates at 10-bit 1,023 levels or less. When the photodiode PD saturates, a signal STS is generated. Since the slope is determined by the storage time ratio, the slope is about 1/8. If the saturation of the photodiode PD is set at 1/2 (500 LSB), approximately a fourfold dynamic range is obtained by this driving. The saturation of the photodiode PD of each pixel varies because a threshold voltage Vth of the read gate varies. As a consequence, the light amount as the start point of the rise of the signal STS also varies.

FIG. 9B shows the photoelectric conversion characteristics after gain processing. Referring to FIG. 9B, the signal STS is amplified by 8 times. The slope is substantially the same as the signal STL.

FIG. 9C shows the sum output characteristic when the signal STS obtained by amplifying the signal STL by 8 times is added. Although the addition level is different because the saturation level of the photodiode PD is different, the sum output signal is obtained substantially linearly in accordance with the light amount. Since the digitized signals STL and STS are separately obtained, the gains can be individually set without separating these signals. Accordingly, it is readily possible to amplify and add the signal STS and linearize the output signal.

Note that this embodiment is explained on the basis of the addition of two signals. However, the dynamic range can be further widened by generating a reference waveform three times or more by the VREF generator 24 in one horizontal scanning period, controlling the pulse signal VREAD by voltages of four levels or more for different storage times, and adding signals different in storage time by using two or more line memories W.

Fourth Embodiment

As a solid-state image sensing device according to the fourth embodiment of the present invention, a first dynamic range widening method capable of increasing a saturation signal charge will be explained below.

Figure 10:
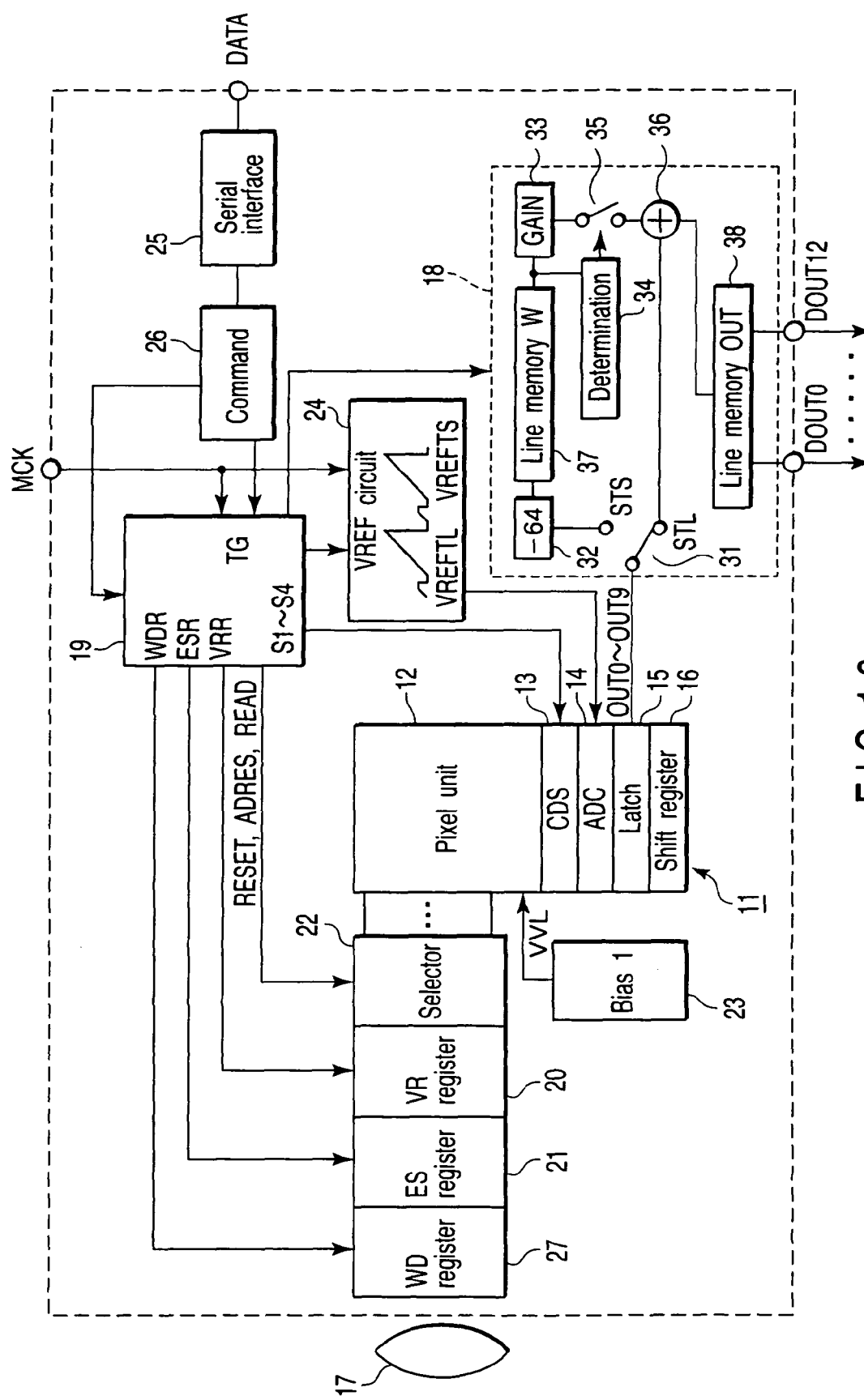
FIG. 10 is a block diagram for explaining a solid-state image sensing device according to the fourth embodiment of the present invention, in which an outline of the arrangement of an amplification type CMOS image sensor is illustrated.

FIG. 10 is a block diagram for explaining the solid-state image sensing device according to the fourth embodiment of the present invention, in which an outline of the arrangement of am amplification type CMOS image sensor is illustrated. This circuit shown in FIG. 10 differs from that shown in FIG. 6 in that no pulse amplitude controller 28 for pixel driving is formed.

Figure 11:
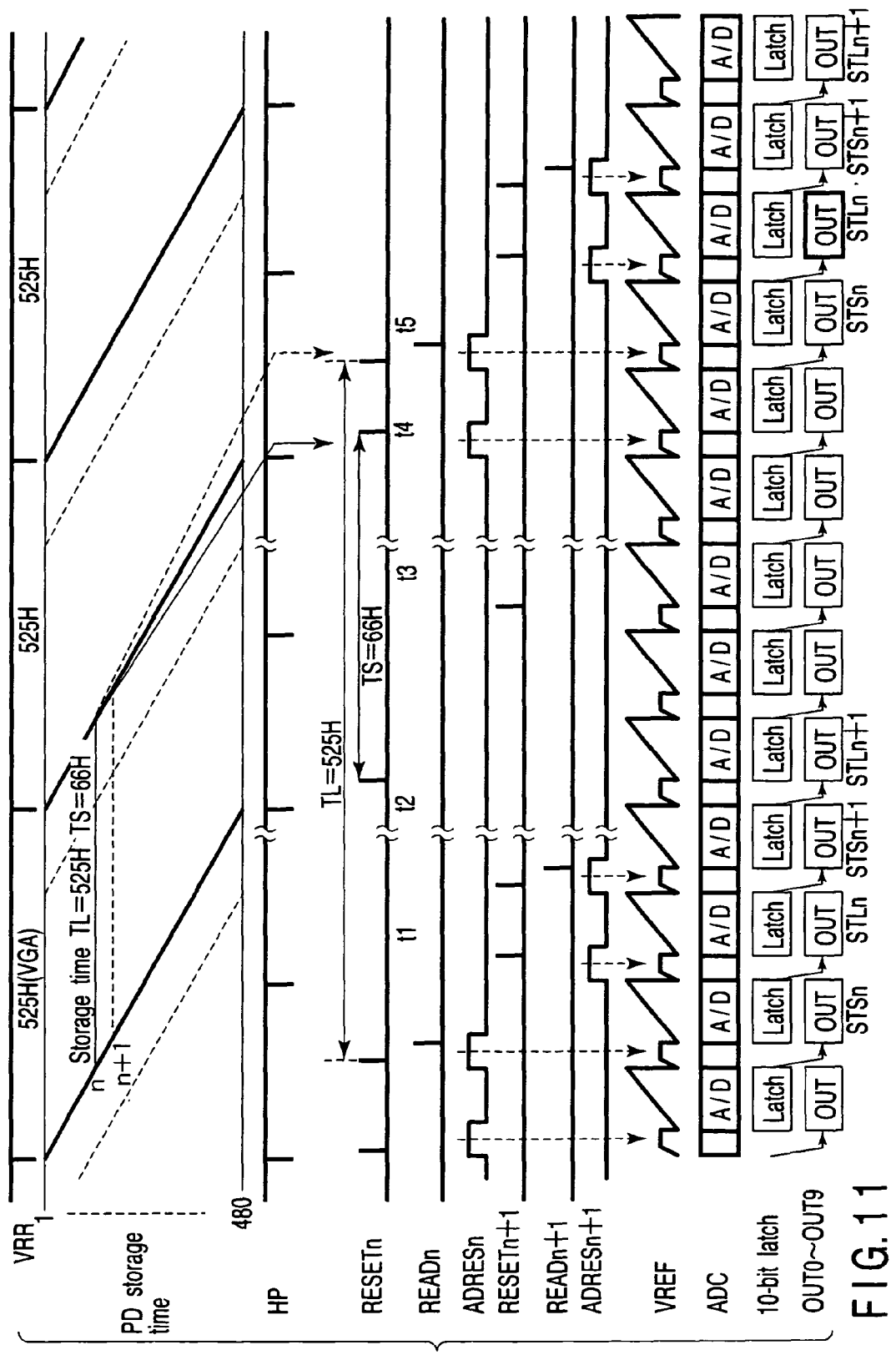
FIG. 11 is a timing chart showing the operation timings of the CMOS image sensor shown in FIG. 10.

FIG. 11 is a timing chart showing the operation timings of the CMOS image sensor shown in FIG. 10. In this embodiment, a storage time TL for photoelectric conversion and storage by a photodiode PD of the nth vertical line is TL=525 H. Also, short storage time TS=66 H. This short storage time can be realized by inputting a reset pulse in the middle of the period of TL=525 H. The storage time TL can be controlled for every 1 H by an ES register 21. The storage time TS can be controlled for every 1 H by a WD register 27.

A first read operation is performed by inputting pulse signals RESETn and ADRESn to a pixel unit 12 in synchronism with a horizontal sync pulse HP at time t4, thereby reading out a signal stored in a detection node FD. As this signal charge read out for the first time, a signal charge stored in the detection node FD is removed by inputting a reset pulse at time t2 in the middle of a storage time of 525 H, and the signal stored in the detection node FD during a period from time t2 to time t4 is read out at time t4. In this case, no read pulse READn is applied.

In this signal read, the signal charge stored in the detection node FD is first read out to a capacitor C2 shown in FIG. 2. Then, the pulse signal RESETn is input to reset the signal charge in the detection node FD, and the reset level is output to a capacitor C1 shown in FIG. 2. This reset level signal is read out by setting the amplitude of a reference waveform at an intermediate level. This intermediate level is automatically adjusted in the sensor so that a light-shielding pixel (OB) portion of the pixel unit 12 has 64 LSB. Then, with respect to the readout signal, a triangular wave is generated as the reference waveform to perform 10-bit digitization in a 0.5 H period as the first half of a horizontal scanning period. The digitized signal is held in a latch circuit, and output as a switching signal STSn from a sensor core 11 and input to a line memory W 37 in a 0.5 H period as the second half of the horizontal scanning period.

In a second read operation (t5) from the pixel unit 12, the pulse signals RESETn, READn, and ADRESn are supplied to the pixel unit 12 after the first 0.5 H to read out a signal charge photoelectrically converted and stored by the photodiode PD. To turn on a reset transistor Tc by changing the pulse signal RESETn to "H" level and then turn off the reset transistor Tc to load the reset level, the signal is read out by setting the amplitude of the reference waveform at an intermediate level. This intermediate level is automatically adjusted in the sensor such that the light-shielding pixel (OB) portion of the pixel unit 12 has 64 LSB. Then, the pulse signal READn is changed to "H" level to turn on a read transistor Td, thereby reading out the signal. With respect to this readout signal, a triangular wave is generated as the reference waveform to perform 10-bit digitization in a 0.5 H period as the second half of the horizontal scanning period. The digitized signal is held in the latch circuit 15, and output as a switching signal STLn from the sensor core 11 in a 0.5 H period as the first half of the next horizontal scanning period.

As shown in FIG. 10, the output signal STSn is delayed by 1 H by the line memory W 37 of a wide dynamic range mixer (WDM) circuit 18, amplified by a gain circuit 33, and added to the signal STLn. The sum signal is input to a line memory OUT 38 where speed conversion is performed, and output at a low speed of ½, thereby outputting data OUT0 to OUT12 in one horizontal scanning period.

The gain of the WDM circuit 18 is set by adjusting the gain multiplier of the signal STSn so that the sum signal (STLn+STSn) is linear in accordance with the light amount. Since the gain is normally calculated by the storage time ratio, it is 525/66=×8 in the above setting. The sensor output signal is output as a 13-bit (DOUT0 to DOUT12) signal.

Figure 12A:
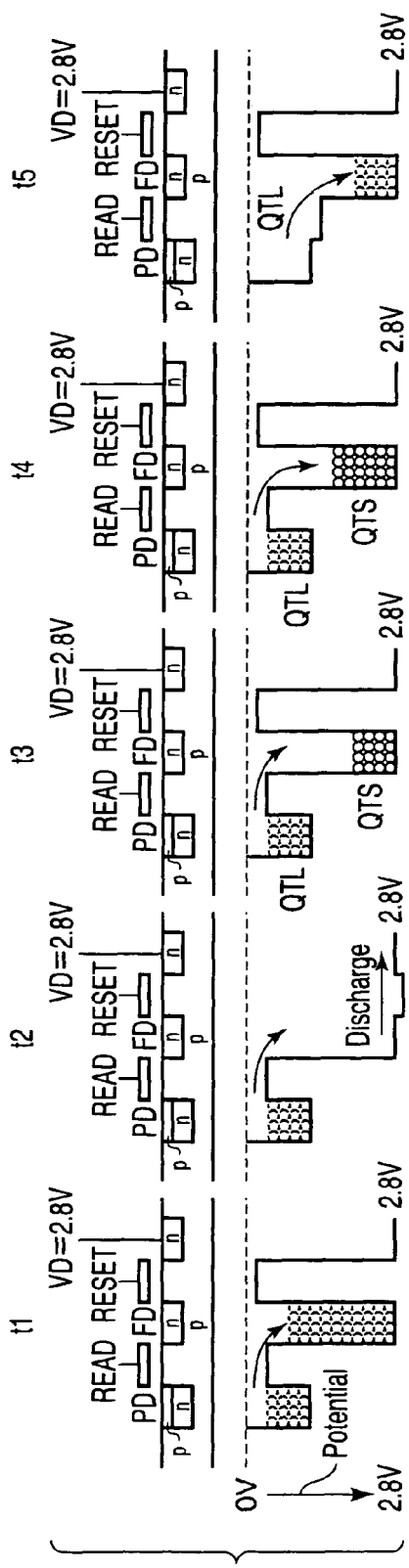
FIG. 12A shows a sectional view and potential diagram of a pixel unit when a large signal is to be stored at times t1 to t5 shown in the operation timing chart of FIG. 11.
Figure 12B:
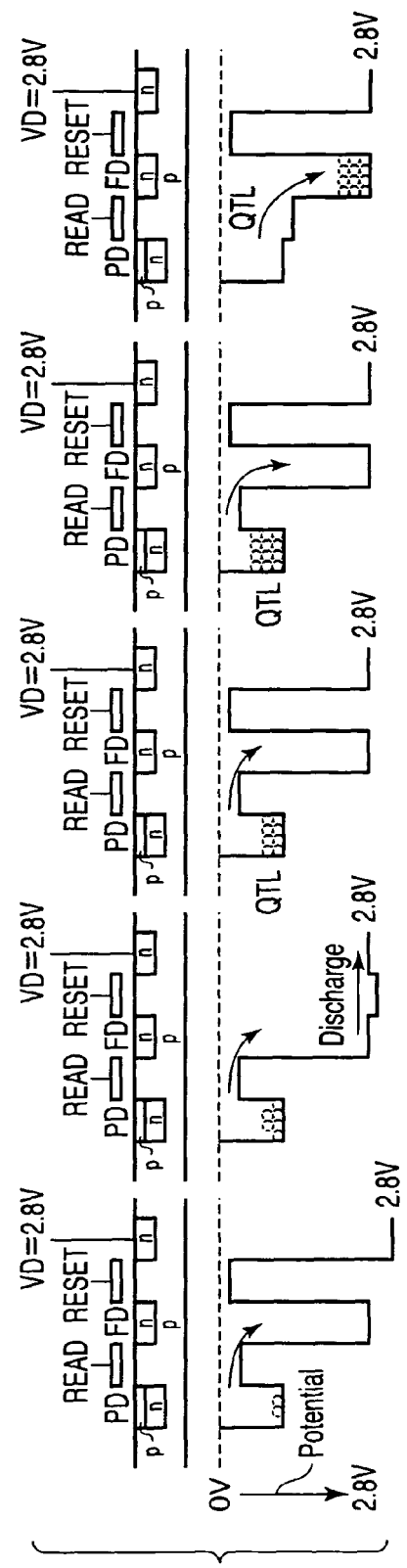
FIG. 12B shows a sectional view and potential diagram of the pixel unit when a small signal is to be stored at times t1 to t5 shown in the operation timing chart of FIG. 11.

FIGS. 12A and 12B are sectional views and potential diagrams of a pixel unit at times t1 to t5 in the operation timing chart shown in FIG. 11. That is, FIG. 12A shows a sectional view and potential diagram when a large signal is to be stored, and FIG. 12B shows a sectional view and potential diagram when a small signal is to be stored.

A photodiode PD is formed by an n-type impurity diffusion region formed in a p-type semiconductor substrate, and the surface of this n-type impurity diffusion region is shielded by a p-type impurity diffusion region. In this manner, a buried photodiode PD having small defects or a small dark nonuniformity is formed. A detection node FD is formed by an n-type impurity diffusion region, and functions together with the n-type impurity diffusion region of the photodiode PD as source and drain regions of a read transistor (read gate) Td. A gate electrode made of polysilicon is formed on a gate insulating film (not shown) formed on the substrate between these n-type impurity diffusion regions. A read pulse READ is supplied to this gate electrode. An n-type impurity diffusion region is formed adjacent to the n-type impurity diffusion region as the detection node FD. This n-type impurity diffusion region functions as a drain region of a reset transistor (reset gate) Tc, and the n-type impurity diffusion region of the detection node FD functions as a source region. A drain voltage VD (=2.8 V, e.g., VDD) is applied to the drain region. A gate electrode made of polysilicon is formed on a gate insulating film (not shown) formed on the substrate between these n-type impurity diffusion regions. A reset pulse RESET is supplied to this gate electrode. The detection node FD can be reset to the drain voltage VD by the reset transistor Tc. Since the read gate is normally open, a low voltage is applied to allow a signal to flow to the detection node FD in a depletion type transistor or in an enhancement type transistor having a closed gate.

When a large signal is to be stored, as shown in FIG. 12A, a signal charge having saturated in the photodiode PD flows to the detection node FD at time t1. At time t2, the reset gate is turned on to remove the signal charge stored in the detection node FD. At time t3, a signal charge larger than the saturation in the photodiode PD flows to the detection node FD and is stored in the detection node FD again. At time t4, the signal stored in the detection node FD is read out. At time t5, the signal charge having saturated in the photodiode PD is read out to the detection node FD by applying a read voltage.

By contrast, when a small signal is to be stored, as shown in FIG. 12B, a signal charge is stored in the photodiode PD at time t1. At time t2, the reset gate pulse RESET is applied to remove a leakage charge from the detection node FD. At time t3, no signal charge flows into the detection node FD because the photodiode PD has not saturated. Although a signal stored in the detection node FD is to be read out at time t4, no signal is output because no signal charge has flowed into the detection node FD. At time t5, the signal charge stored in the photodiode PD is read out to the detection node FD by applying a read pulse. When a signal STS is input, the WDM circuit 18 adds it to a signal STL.

Figure 13A:
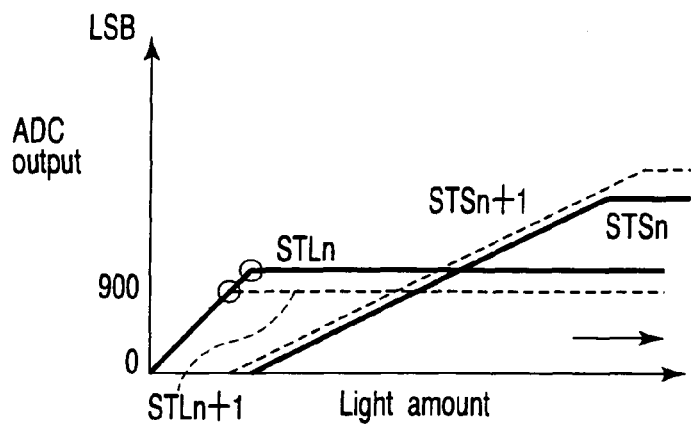
FIG. 13A is a graph for explaining the operation of a WDM circuit in the solid-state image sensing device according to the fourth embodiment of the present invention, in which the relationship between the ADC output and light amount is illustrated.
Figure 13B:
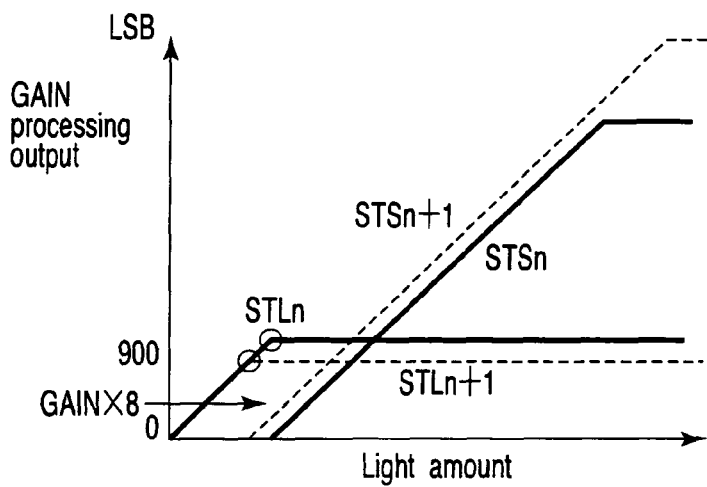
FIG. 13B is a graph for explaining the operation of the WDM circuit in the solid-state image sensing device according to the fourth embodiment of the present invention, in which the relationship between the gain processing output and light amount is illustrated.
Figure 13C:
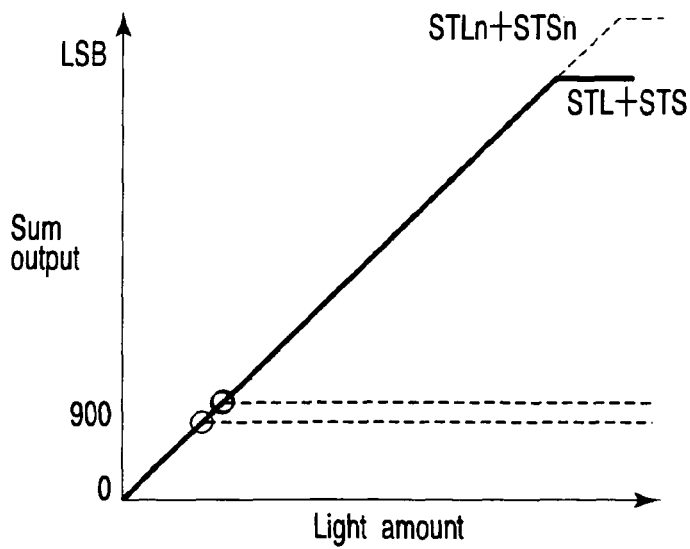
FIG. 13C is a graph for explaining the operation of the WDM circuit in the solid-state image sensing device according to the fourth embodiment of the present invention, in which the relationship between the sum output and light amount is illustrated.

FIGS. 13A to 13C each show the operation of the WDM circuit 18. FIG. 13A shows an ADC output signal, in which the abscissa indicates the light amount, and the ordinate the ADC output level. First, the signal STL increases in proportion to the light amount. The ADC output increases up to the saturation signal in the photodiode PD. This saturation is so set that the photodiode PD saturates at 10-bit 1,023 levels or less. When the photodiode PD saturates, a signal STS is generated. Since the slope is determined by the storage time ratio, the slope is about 1/8. If the saturation of the photodiode PD is set at 900 LSB, approximately an eightfold dynamic range is obtained by this driving. The saturation of the photodiode PD of each pixel varies because a threshold voltage Vth of the read gate also varies. As a consequence, the light amount as the start point of the rise of the signal STS varies.

FIG. 13B shows the photoelectric conversion characteristics after gain processing. Referring to FIG. 13B, the signal STS is amplified by 8 times. The slope is substantially the same as the signal STL.

FIG. 13C shows the sum output characteristic when the signal STS obtained by amplifying the signal STL by 8 times is added. Although the addition level is different because the saturation level of the photodiode PD is different, the sum output signal is obtained substantially linearly in accordance with the light amount.

In this embodiment, the signals STL and STS are separately obtained, so the gains can be individually set. Accordingly, it is readily possible to amplify and add the signal STS alone and linearize the output signal.

Fifth Embodiment

As a solid-state image sensing device according to the fifth embodiment of the present invention, a second dynamic range widening method capable of increasing a saturation signal charge will be explained below.

Figure 14:
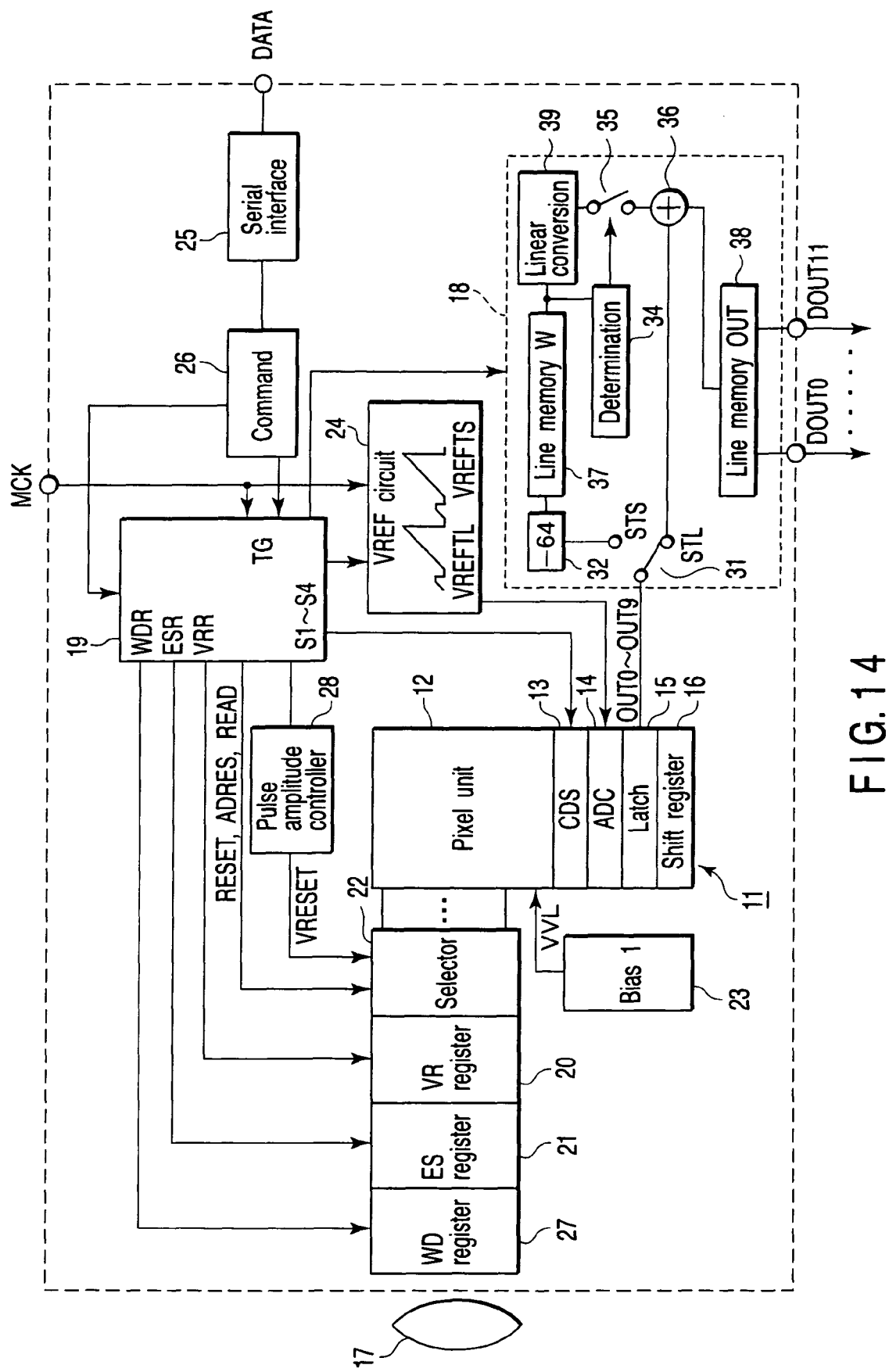
FIG. 14 is a block diagram for explaining a solid-state image sensing device according to the fifth embodiment of the present invention, in which an outline of the arrangement of an amplification type CMOS image sensor is illustrated.

FIG. 14 is a block diagram for explaining the solid-state image sensing device according to the fifth embodiment of the present invention, in which an outline of the arrangement of am amplification type CMOS image sensor is illustrated. This circuit shown in FIG. 14 differs from that shown in FIG. 10 in that a pulse amplitude controller 28 for pixel resetting is formed. A WDM circuit 18 contains a circuit 39 which linearly converts a nonlinear output signal of a signal STS which is delayed by a line memory W 37. The output signal of this sensor has 12 bits (DOUT0 to DOUT11).

Figure 15:
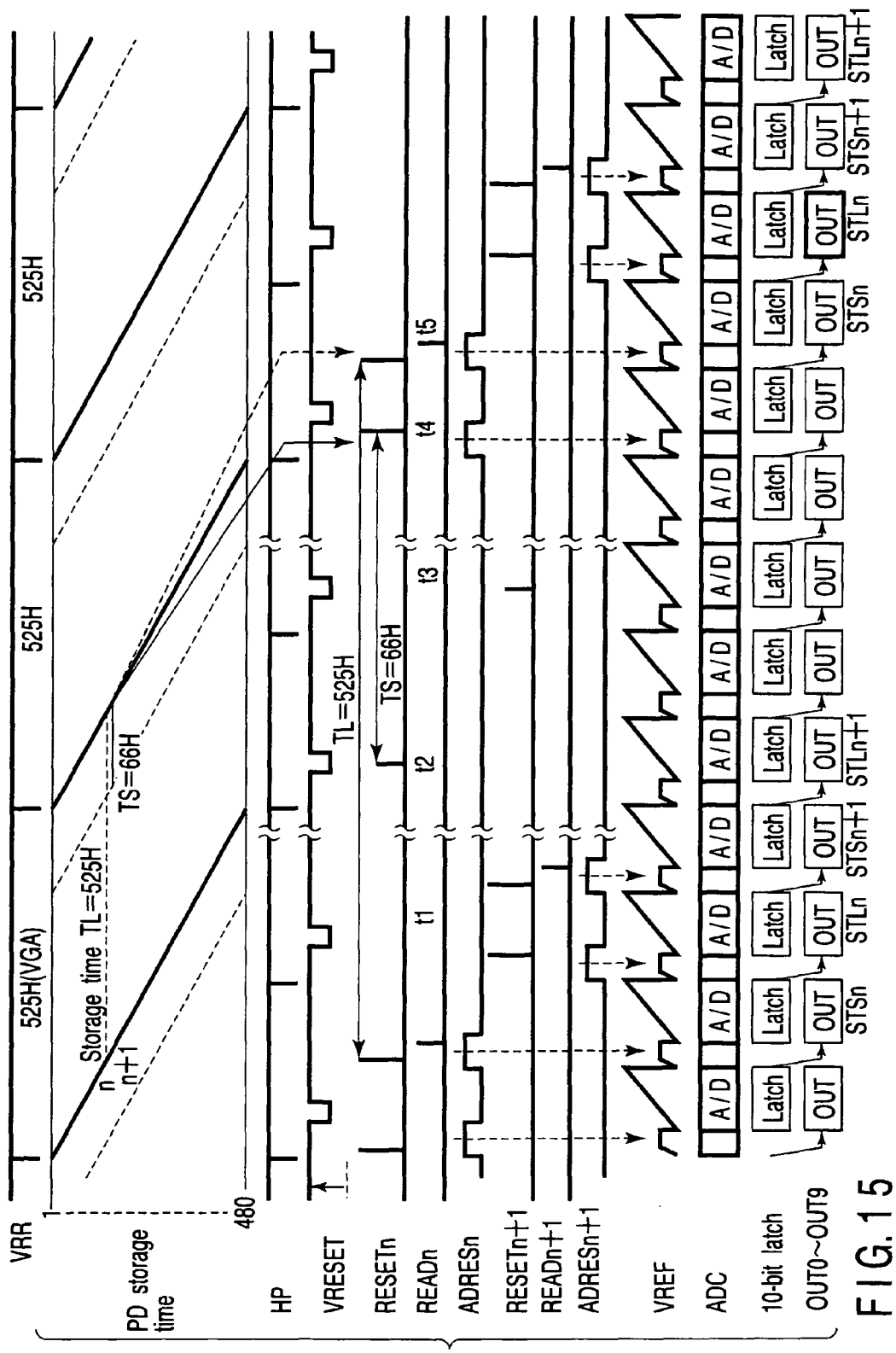
FIG. 15 is a timing chart showing the operation timings of the CMOS image sensor shown in FIG. 14.

FIG. 15 is a timing chart showing the operation timings of the CMOS image sensor shown in FIG. 14. In this embodiment, a storage time TL for photoelectric conversion and storage by a photodiode PD of the nth vertical line is TL=525 H. Also, short storage time TS=66 H. In the long storage time TL, the amplitude of a reset pulse signal is controlled at high level (=2.8 V). In the short storage time TS, the amplitude of the reset pulse signal is controlled at low level (=1.5 V). This pulse signal is generated under the control of the pulse amplitude controller 28. The storage time TL can be controlled for every 1 H by an ES register 21. The storage time TS can be controlled for every 1 H by a WD register 27.

In a first read operation, a high-level pulse signal VRESET (=2.8 V) and pulse signals RESETn and ADRESn are input to a pixel unit 12 in synchronism with a horizontal sync pulse HP at time t4, thereby reading out a signal stored in a detection node FD. As this signal charge read out for the first time, a low-level pulse signal VRESET (=1.5 V) is input to the amplitude of the reset pulse signal at time t2 in the middle of a storage time of 525 H, thereby removing a partial signal charge from the detection node FD. Then, a signal charge stored in the detection node FD during a period from time t2 to time t4 is read out from the pixel unit 12 at time t4. In this case, no read pulse READn is applied.

In this signal read, the signal charge stored in the detection node FD is first read out to a capacitor C2 shown in FIG. 2. Then, the pulse signal RESETn is input to reset the signal charge in the detection node FD, and the reset level is output to a capacitor C1 shown in FIG. 2. When this reset level signal is read out, the amplitude of a reference waveform is set at an intermediate level. This intermediate level is automatically adjusted in the sensor so that a light-shielding pixel (OB) portion of the pixel unit 12 has 64 LSB. Then, with respect to the readout signal, a triangular wave is generated as the reference waveform to perform 10-bit digitization in a 0.5 H period as the first half of a horizontal scanning period. The digitized signal is held in a latch circuit 15, and output as a switching signal STSn from a sensor core 11 and input to the line memory W 37 in a 0.5 H period as the second half of the horizontal scanning period.

In a second read operation (t5) from the pixel unit 12, high-level pulse signals RESETn, READn, and ADRESn are supplied to the pixel unit 12 after the first 0.5 H to read out a signal charge photoelectrically converted and stored by the photodiode PD. To turn on a reset transistor Tc by changing the pulse signal RESETn to "H" level and then turn off the reset transistor Tc to load the reset level, the signal is read out by setting the amplitude of the reference waveform at an intermediate level. This intermediate level is automatically adjusted in the sensor such that the light-shielding pixel (OB) portion of the pixel unit 12 has 64 LSB. Then, the pulse signal READn is changed to "H" level to turn on a read transistor Td, thereby reading out the signal. With respect to this readout signal, a triangular wave is generated as the reference waveform to perform 10-bit digitization in a 0.5 H period as the second half of the horizontal scanning period. The digitized signal is held in the latch circuit 15, and output as a switching signal STLn from the sensor core 11 in a 0.5 H period as the first half of the next horizontal scanning period.

As shown in FIG. 14, the output signal STSn is delayed by 1 H by the line memory W 37 of the wide dynamic range mixer (WDM) circuit 18, and the linear converter 39 linearly converts the nonlinear output signal. The obtained signal is added to the signal STLn. The sum signal is input to a line memory OUT 38 where speed conversion is performed, and output at a low speed of ½, thereby outputting data in one horizontal scanning period.

The gain of the WDM circuit 18 is set by adjusting the gain multiplier of the signal STSn so that the sum signal (STLn+STSn) is linear in accordance with the light amount. Since the gain is normally calculated by the storage time ratio, it is 525/66=×8 in the above setting. The sensor output signal is output as a 14-bit (DOUT0 to DOUT13) signal.

Figure 16A:
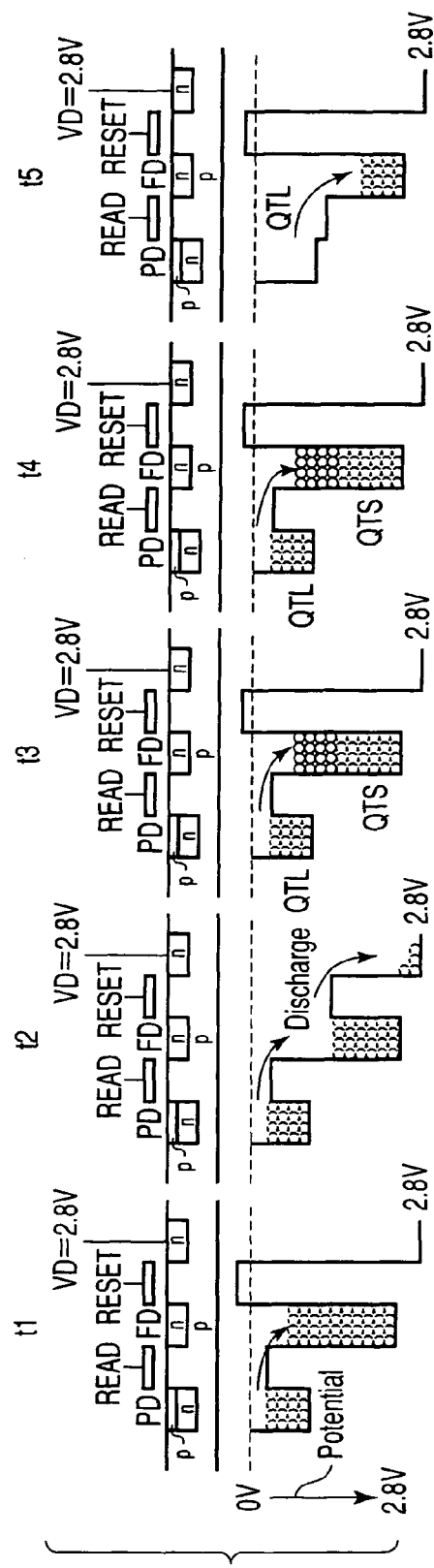
FIG. 16A shows a sectional view and potential diagram of a pixel unit when a large signal is to be stored at times t1 to t5 shown in the operation timing chart of FIG. 15.
Figure 16B:
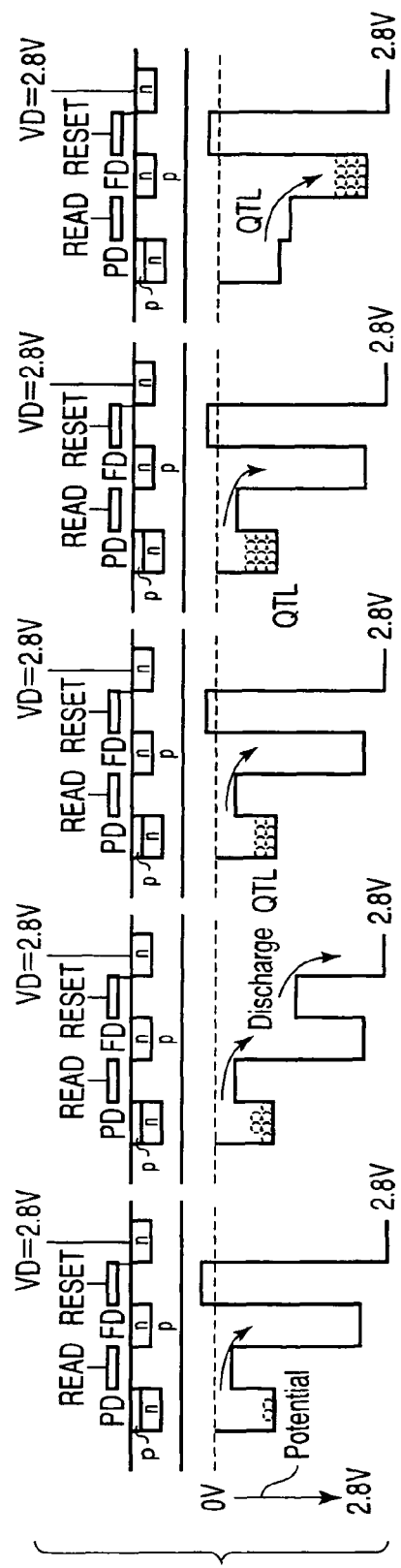
FIG. 16B shows a sectional view and potential diagram of the pixel unit when a small signal is to be stored at times t1 to t5 shown in the operation timing chart of FIG. 15.

FIGS. 16A and 16B are sectional views and potential diagrams of a pixel unit at times t1 to t5 in the operation timing chart shown in FIG. 15. That is, FIG. 16A shows a sectional view and potential diagram when a large signal is to be stored, and FIG. 16B shows a sectional view and potential diagram when a small signal is to be stored.

A photodiode PD is formed by an n-type impurity diffusion region formed in a p-type semiconductor substrate, and the surface of this n-type impurity diffusion region is shielded by a p-type impurity diffusion region. In this manner, a buried photodiode PD having small defects or a small dark nonuniformity is formed. A detection node FD is formed by an n-type impurity diffusion region, and functions together with the n-type impurity diffusion region of the photodiode PD as source and drain regions of a read transistor (read gate) Td. A gate electrode made of polysilicon is formed on a gate insulating film (not shown) formed on the substrate between these n-type impurity diffusion regions. A read pulse READ is supplied to this gate electrode. An n-type impurity diffusion region is formed adjacent to the n-type impurity diffusion region as the detection node FD. This n-type impurity diffusion region functions as a drain region of a reset transistor (reset gate) Tc, and the n-type impurity diffusion region of the detection node FD functions as a source region. A drain voltage VD (=2.8 V, e.g., VDD) is applied to the drain region. A gate electrode made of polysilicon is formed on a gate insulating film (not shown) formed on the substrate between these n-type impurity diffusion regions. A reset pulse RESET is supplied to this gate electrode. The detection node FD can be reset to the drain voltage VD by the reset transistor Tc. The potential of the detection node FD is determined by high level of the reset gate. The read gate applies a low voltage to a slightly opened depletion type transistor or enhancement type transistor. Also, even when a high-level voltage is applied, the potential of the reset gate is lower than a power supply VDD (=2.8 V). A signal amount as the Knee point of the detection node FD can be controlled by a voltage difference in VRESET.

When a large signal is to be stored, as shown in FIG. 16A, a signal charge having saturated in the photodiode PD flows to the detection node FD at time t1. At time t2, the reset gate is opened at low level to remove a portion of the signal charge stored in the detection node FD. At time t3, a signal charge larger than the saturation signal in the photodiode PD flows to the detection node FD to store a signal in the detection node FD again. At time t4, this signal stored in the detection node FD is read out. After that, the detection node FD is reset by a high-level reset pulse signal. At time t5, the signal charge having saturated in the photodiode PD is read out to the detection node FD by applying a read pulse.

By contrast, when a small signal is to be stored, as shown in FIG. 16B, a signal charge is stored in the photodiode PD at time t1. At time t2, the reset gate is opened at low level, but no signal charge is removed because no signal charge is stored in the detection node FD. At time t3, no signal charge flows into the detection node FD because the photodiode PD has not saturated. At time t4, no signal is output because no signal charge has flowed into the detection node FD. At time t5, the signal charge stored in the photodiode PD is read out to the detection node FD by applying a read voltage.

Figure 17A:
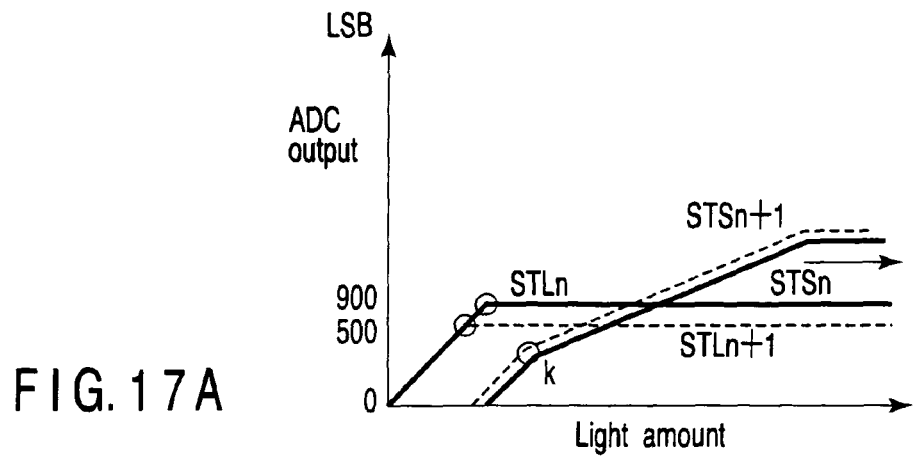
FIG. 17A is a graph for explaining the operation of a WDM circuit in the solid-state image sensing device according to the fifth embodiment of the present invention, in which the relationship between the ADC output and light amount is illustrated.
Figure 17B:
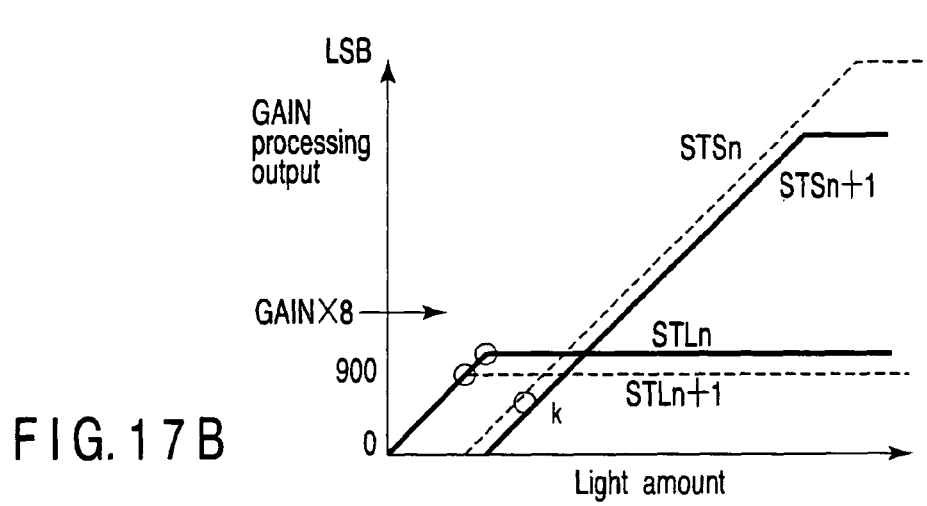
FIG. 17B is a graph for explaining the operation of the WDM circuit in the solid-state image sensing device according to the fifth embodiment of the present invention, in which the relationship between the gain processing output and light amount is illustrated.
Figure 17C:
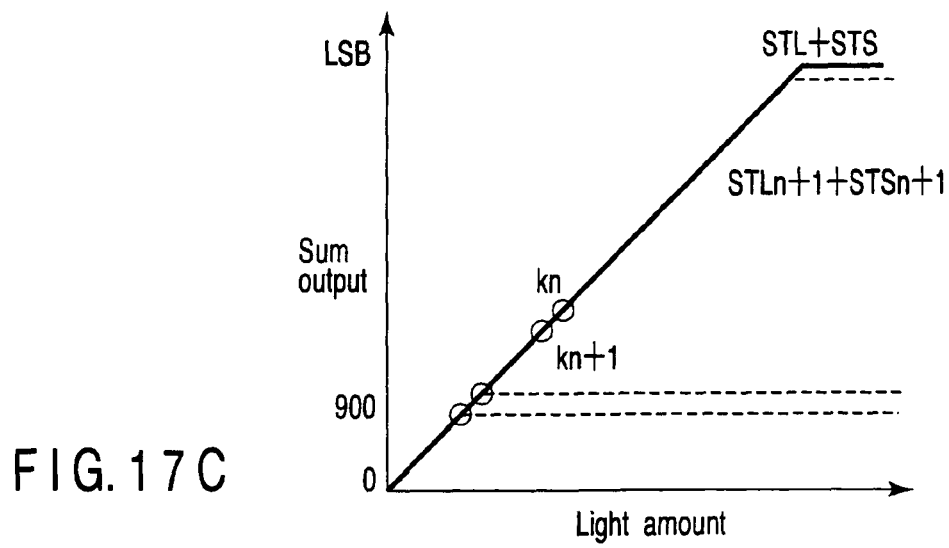
FIG. 17C is a graph for explaining the operation of the WDM circuit in the solid-state image sensing device according to the fifth embodiment of the present invention, in which the relationship between the sum output and light amount is illustrated.

FIGS. 17A to 17C each show the operation of the WDM circuit 18. FIG. 17A shows an ADC output signal, in which the abscissa indicates the light amount, and the ordinate the ADC output level. First, a signal STL increases in proportion to the light amount. The ADC output increases up to the saturation signal in the photodiode PD. This saturation is so set that the photodiode PD saturates at 10-bit 1,023 levels or less. When the photodiode PD saturates, a signal STS is generated. The initial slope is the same as the signal STL because the storage time remains the same. After that, the slope becomes about ⅛ at a signal level Knee (k) which is determined by the difference between high level and low level of a reset pulse signal. This slope is determined by the storage time TS. If the saturation of the detection node FD is set at 500 LSB, approximately a fivefold dynamic range is obtained by this driving. The saturation of the photodiode PD of each pixel varies because a threshold voltage Vth of the read gate varies. Accordingly, the light amount as the start point of the rise of the signal STS also varies.

FIG. 17B shows the photoelectric conversion characteristics after nonlinear processing. The signal STS is obtained by amplifying signals at k points or more by 8 times. As a consequence, the nonlinear STS output signal is almost linear.

FIG. 17C shows the sum output characteristic when the signal STS obtained by linearizing the signal STL is added. Although the addition level is different because the saturation level of the photodiode PD is different, the sum output signal is obtained substantially linearly in accordance with the light amount.

Note that the linear converter 39 is used in this embodiment, but it is also possible to separately output the signal at time t4 twice. In this case, the signal of the detection node FD is reset to the same level as that at time t2, thereby A/D-converting the signal STSn and outputting a digital signal. Then, the signal remaining in the detection node FD is reset by the pulse signal VRESET (=2.8 V). This signal is A/D-converted again to output a digital signal. For the third time, a signal charge stored in the photodiode PD is digitized and output as a digital signal. In this manner, digitization is performed three times in one horizontal scanning period. The dynamic range is widened by adding the thus obtained individual digital signals by the WDM circuit 18.

Sixth Embodiment

Figure 18:
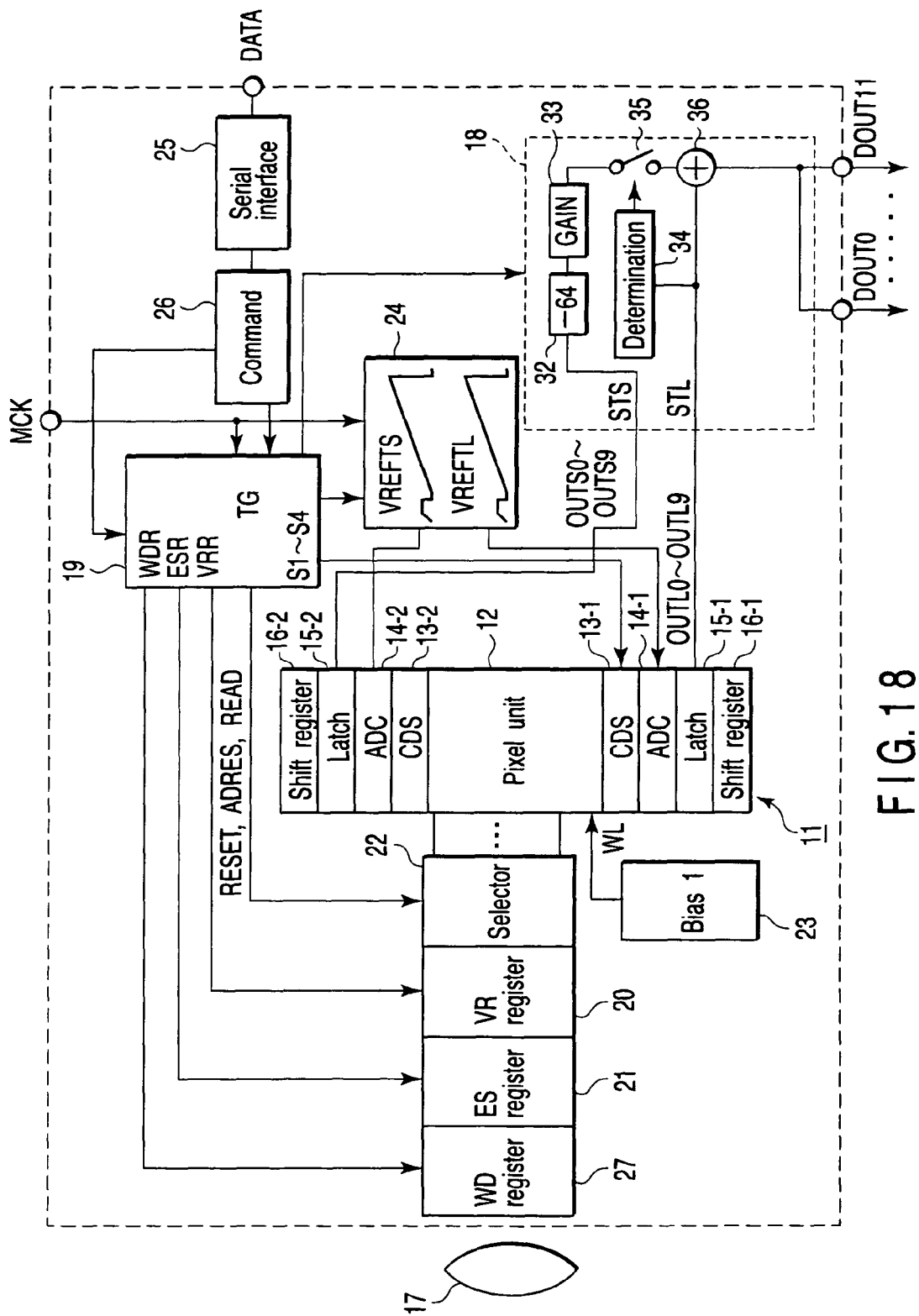
FIG. 18 is a block diagram for explaining a solid-state image sensing device according to the sixth embodiment of the present invention, in which an outline of the arrangement of an amplification type CMOS image sensor is illustrated.

FIG. 18 is a block diagram for explaining a solid-state image sensing device according to the sixth embodiment of the present invention, in which an outline of the arrangement of an amplification type CMOS image sensor is illustrated. This circuit differs from that shown in FIG. 14 in that an ADC 14-2 is additionally formed in the upper portion of a sensor core 11. To control the ADC 14-2, a VREF generator 24 includes a VREFTL circuit and VREFTS circuit which respectively supply signals to a lower ADC 14-1 and the upper ADC 14-2. Therefore, a signal from each pixel is read out at the beginning of a horizontal sync pulse. After that, the lower and upper ADC's 14-1 and 14-2 perform digitization at the same time. Accordingly, signals OUTS and OUTL are simultaneously obtained from the upper and lower portions.

In the arrangement as described above, a WDM circuit 18 need not have any line memory M. The signal OUTL is input to the WDM circuit 18 in which a signal STL is input to an adder 36 and determination circuit 34. On the other hand, the signal OUTS undergoes −64 LSB processing, and is amplified by a gain circuit 33. If the signal STL saturates with 1023 LSB in the determination circuit 34, a switch 35 is turned on to input the amplified signal STS to the adder 36 where the signal STS is added to the signal STL. The sum signal is output from the sensor after the number of bits is increased to 12. Since the signals OUTS and OUTL are output in substantially a horizontal scanning period, a line memory OUT for speed conversion is also unnecessary.

Note that the sixth embodiment is also applicable to the first to fifth embodiments described above.

Seventh Embodiment

Figure 19:
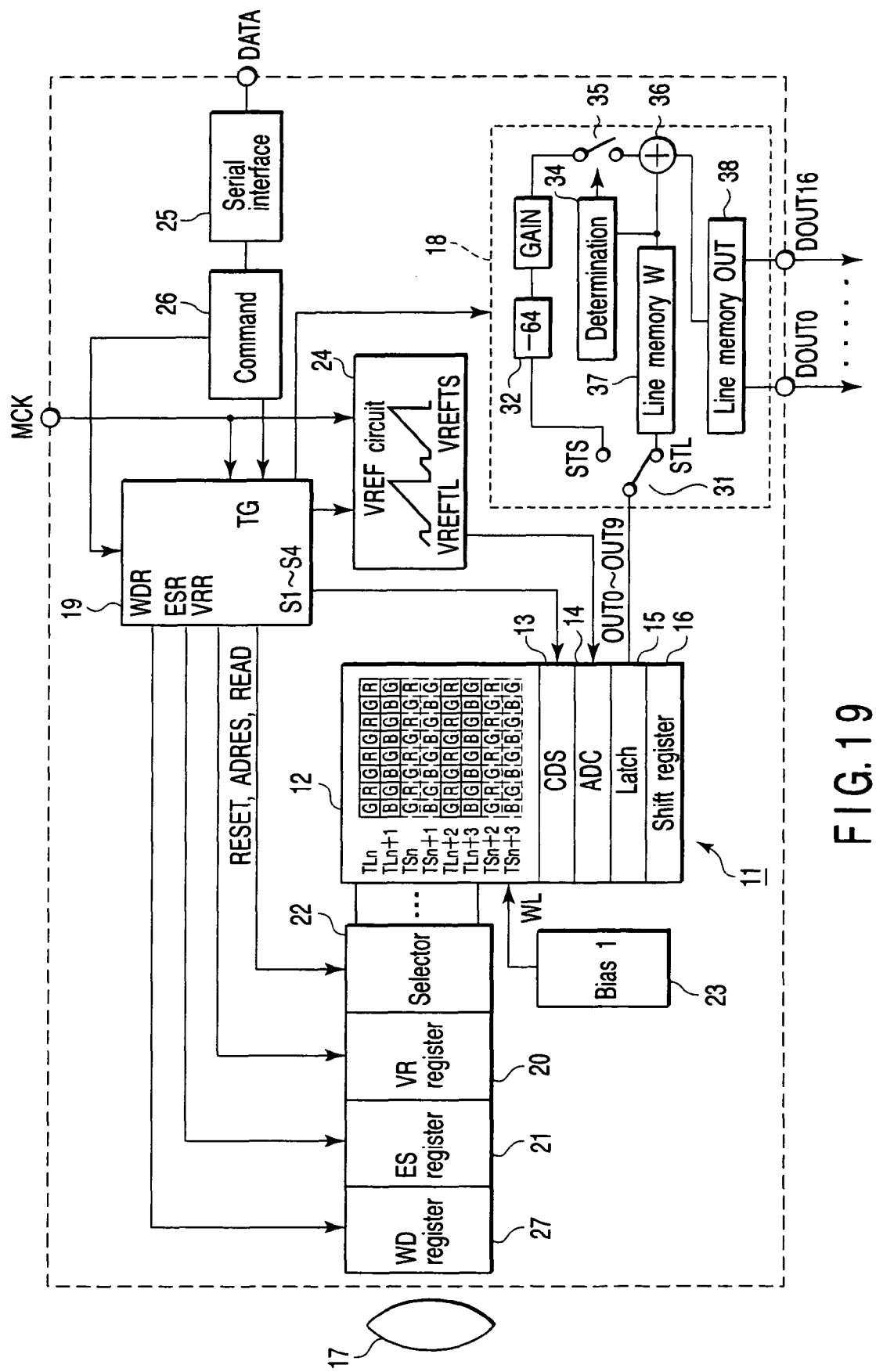
FIG. 19 is a block diagram for explaining a solid-state image sensing device according to the seventh embodiment of the present invention, in which an outline of the arrangement of an amplification type CMOS image sensor is illustrated.

FIG. 19 is a block diagram for explaining a solid-state image sensing device according to the seventh embodiment of the present invention, in which an outline of the arrangement of an amplification type CMOS image sensor is illustrated. This circuit differs from that shown in FIG. 4 in that a WDM circuit 18 includes only one line memory W 37. In a pixel unit 12, signals of two lines are added as one signal. That is, signal lines TLn and TSn are different, and a long-storage-time signal TL and short-storage-time signal TS are obtained for every two-line pair. An ES register 21 controls the long-storage-time signal TL, and a WD register 27 controls the short-storage-time signal TS. A read method is the same as in FIG. 3 except that the TL and TS signals are read out from different lines. Especially when this sensor is used in monitoring by which the number of vertical lines is ½, it is possible to realize a high resolution in a standard mode and a wide dynamic range in a monitoring mode.

Eighth Embodiment

Figure 21A:
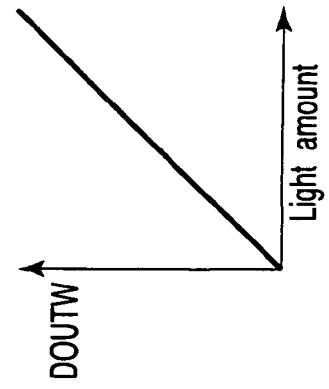
FIGS. 21A to 21C are graphs showing the processing of a first method in the CMOS image sensor shown in FIG. 20.
Figure 21B:
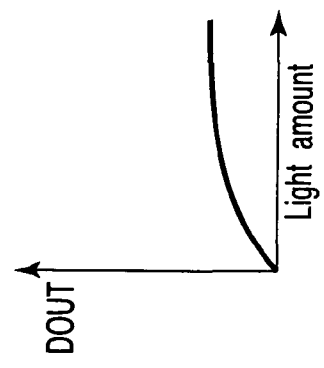
Figure 21C:
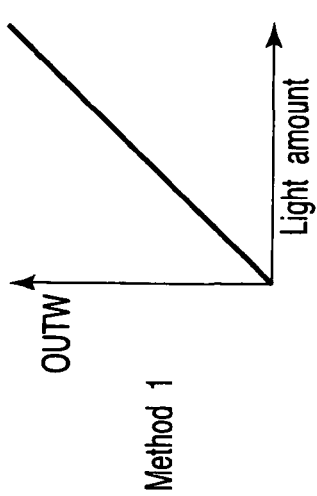
Figure 22A:
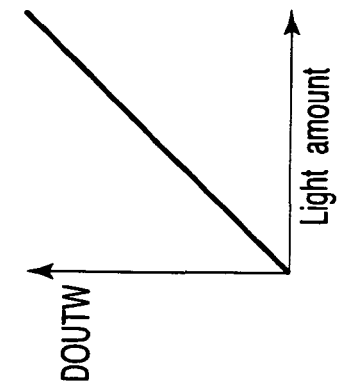
FIGS. 22A to 22C are graphs showing the processing of a second method in the CMOS image sensor shown in FIG. 20.
Figure 22B:
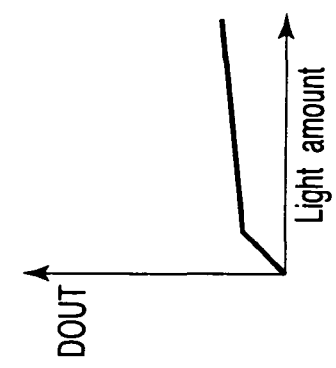
Figure 22C:
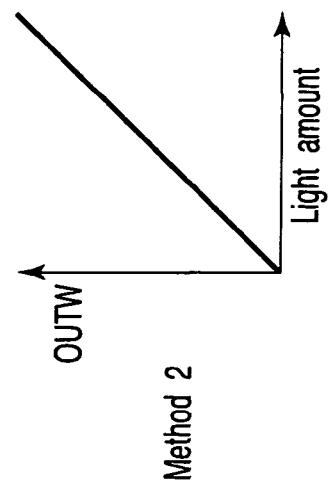

FIG. 20 is a view for explaining a solid-state image sensor according to the eighth embodiment of the present invention, in which the signal processing configuration of an amplification type CMOS image sensor is illustrated. That is, FIG. 20 shows the arrangement from a WDM circuit 18. FIGS. 21A to 21C and 22A to 22C illustrate the operations of the CMOS image sensor shown in FIG. 20, in which FIGS. 21A to 21C show a first method and FIGS. 22A to 22C show a second method.

In a wide dynamic range mode, the number of bits of the sensor output increases. This is so because the increase in number of pins increases the chip size or module size. This also increases the noise of the digital output. Therefore, the eighth embodiment reduces the number of output bits.

That is, the number of bits of the output signal from the WDM circuit 18 increases. The number of bits of the output is reduced by taking a white balance (WB) between R, G, and B signals with respect to the increased signal, and compressing a high-level signal by a signal compressor 40. The signal compressor 40 highly compresses the output signal from the WDM circuit 18 into a short-storage-time signal by a gamma table or segmented compression conversion.

The compression method is a gamma correction method used in signal processing, or a method which linearly compresses a certain level or more. A DSP 41 performs signal processing by linearizing the signal by the reverse of the above compression method. The white balance is taken by controlling the gains of R, G, and B on the basis of signal processing information of the DSP 41. Although the white balance need not be taken on the sensor side, the conventional 10-bit processing can be directly used in the subsequent signal processing if the white balance is taken. That is, the compressed signal from the DSP side need not be restored.

A column ADC type CMOS sensor having a wide dynamic range can be implemented by separately digitizing a long-storage-time signal and short-storage-time signal and adding the two readout signals in one horizontal scanning period.

Accordingly, a wide dynamic range corresponding to a complete transfer type photodiode can be obtained. At low illuminance, a signal having a small dark nonuniformity is obtained by making the most of the complete transfer type photodiode, so the image quality can be improved. Also, when a signal is to be stored in a detection node, a leakage signal can be reduced by shortening the storage time in the detection node. Furthermore, it is conventionally difficult to separate the long-storage-time signal and short-storage-time signal. In this embodiment, however, no such separating operation is necessary because the long-storage-time signal and short-storage-time signal are separately output.

As described above, in the solid-state image sensing device according to an embodiment of the present invention, pixel units each comprising a photodiode, a storage means for storing an electric charge photoelectrically converted by the photodiode, a reading means for reading out the stored electric charge to a detection node, an amplifying means for outputting the electric charge from the detection node, and a resetting means for resetting the detection node are two-dimensionally arranged on a semiconductor substrate, an output signal from the pixel unit is input to an ADC formed at the end of the pixel unit area, and an digitized digital output signal is output. This solid-state image sensing device comprises a circuit which reads out a plurality of signals different in storage time from the pixel unit during the storage period of one frame of the solid-state image sensing device, digitizes the readout signals, and adds a plurality of digital output signals obtained.

Desirable embodiments are as follows.

(a) The above device comprises a circuit which delays one of the digitized output signals by inputting it to a line memory, and adds the output signal from this line memory and another undelayed digital signal.

(b) The above device comprises a wide dynamic rage mixer circuit which stores a long-storage-time signal and short-storage-time signal in the pixel unit, separately reads out the long-storage-time signal and short-storage-time signal from the pixel unit, digitizes the readout signals, amplifies the short-storage-time signal, adds the amplified signal and the long-storage-time signal to make the number of bits larger than that of the ADC, and outputs the obtained signal.

(c) The above device comprises a signal compressor which highly compresses the output signal from the wide dynamic range mixer circuit into a short-storage-time signal by a gamma table or segmented compression conversion.

Also, in the solid-state image sensing device according to another embodiment of the present invention, pixel units each comprising a photodiode, a storage means for storing an electric charge photoelectrically converted by the photodiode, a reading means for reading out the stored electric charge to a detection node, an amplifying means for outputting the electric charge from the detection node, and a resetting means for resetting the detection node are two-dimensionally arranged on a semiconductor substrate, output signals from the pixel units are input to ADCs formed at the upper and lower ends of the pixel unit area, and digitized digital output signals are output. This solid-state image sensing device comprises a circuit which stores a long-storage-time signal and short-storage-time signal in the pixel unit during the storage period of one frame of the solid-state image sensing device, reads out the long-storage-time signal from the pixel unit, outputs the readout signal from one ADC, outputs the short-storage-time signal from the other AD converter, and adds the two digitizing output signals.

Desirable embodiments are as follows.

(a) The above device comprises a long-storage-time control vertical register and short-storage-time control vertical register for controlling the storage time of the pixel unit.

(b) The above device comprises a voltage controller which varies the read voltage of the reading means for reading out a signal from the photodiode during the operation period of one frame.

(c) The above device comprises a voltage controller which varies the applied voltage of the resetting means for resetting the detection node during the operation period of one frame.

(d) The above device comprises a circuit which pairs a long-storage-time signal and short-storage-time signal of different vertical lines in the pixel unit, separately reads out these signals, digitizes the readout signals, and adds the digitized output signals.

As described above, according to one aspect of this invention, a solid-stage image sensing device capable of widening the dynamic range without deteriorating the image quality is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state image sensing device comprising:
a pixel unit in which cells are two-dimensionally arranged on a semiconductor substrate, each cell including photoelectric converting means for storing an electric charge obtained by photoelectrically converting incident light, reading means for reading out the electric charge stored in the photoelectric converting means to a detection node, amplifying means for amplifying the electric charge read out to the detection node and outputting the amplified electric charge, and resetting means for resetting the detection node;
an analog-to-digital converter configured to convert an output analog signal from the amplifying means into a digital signal, and output the digital signal;
a controller configured to control the pixel unit and the analog-to-digital converter, and cause the analog-to-digital converter to digitize an analog short-storage-time signal and an analog long-storage-time signal read out, by using a same vertical signal line, from the pixel unit during a storage period of an electric charge of one frame so as to obtain a digitized analog short-storage-time signal and a digitized analog long-storage-time signal; and
a wide dynamic range mixer circuit configured to amplify the digitized analog short-storage-time signal to obtain an amplified digitized analog short-storage-time signal, and add the amplified digitized analog short-storage-time signal and the digitized analog long-storage-time signal to make the number of bits larger than the number of bits of the analog-to-digital converter, and output a sum signal.

2. A device according to claim 1, further comprising load transistors for a source follower circuit, current paths of the load transistors being connected between vertical signal lines of the pixel unit and a ground point, and a bias generator which applies a bias voltage to a gate of the load transistor.

3. A device according to claim 2, further comprising a reference waveform generator which generates a reference waveform for digitization, and supplies the reference waveform to the analog-to-digital converter.

4. A device according to claim 3, wherein the reference waveform for digitization generated by the reference waveform generator includes a first triangular wave and a second triangular wave to execute digitization twice in one horizontal scanning period.

5. A device according to claim 2, further comprising a noise canceller which is placed between the pixel unit and the analog-to-digital converter, removes noise from an analog signal corresponding to the electric charge generated by the photoelectric converting means, and supplies the analog signal to the analog-to-digital converter.

6. A device according to claim 5, further comprising a latch circuit which latches an output digital signal from the analog-to-digital converter.

7. A device according to claim 6, further comprising a shift register which sequentially transfers and reads out the digital signal latched by the latch circuit.

8. A device according to claim 1, further comprising a line memory which receives one of digital signals obtained by digitizing a plurality of analog signals different in storage time in the photoelectric converting means by the analog-to-digital converter, and an adder which adds a delayed digital signal output from the line memory and a digital signal not delayed by the line memory.

9. A device according to claim 1, further comprising a circuit configured to add digital signals corresponding to an analog long-storage-time signal and an analog short-storage-time signal individually read out from the pixel unit, digitized by the analog-to-digital converter, and read out to a pair of different vertical lines.

10. A device according to claim 1, further comprising a signal compressor configured to highly compress the output signal from the wide dynamic range mixer circuit into a short-storage-time signal by a gamma table or segmented compression conversion.

11. A device according to claim 1, further comprising a first vertical register for controlling a long storage time and a second vertical register for controlling a short storage time, both of which are used to control a storage time of the pixel unit.

12. A device according to claim 1, further comprising a voltage controller which varies a readout voltage from the reading means in an operation period of one frame.

13. A device according to claim 1, further comprising a voltage controller which varies an applied voltage of the resetting means in an operation period of one frame.

14. A device according to claim 1, further comprising a circuit which pairs a long-storage-time signal and a short-storage-time signal of different vertical lines in the pixel unit, separately reads out and A/D-converts the signals, and adds A/D-converted output signals.

15. A device according to claim 1, wherein the photoelectric converting means comprises a photodiode having a grounded anode, the reading means comprises a read transistor having a current path one end of which is connected to a cathode of the photodiode, and having a gate to which a read pulse is supplied, the amplifying means comprises an amplifying transistor having a gate connected to the other end of the current path of the read transistor, and having a current path one end of which is connected to a vertical signal line, the resetting means comprises a reset transistor having a current path one end of which is connected to a power supply, and the other end of which is connected to the gate of the amplifying transistor, and having a gate to which a reset pulse is supplied, and the detection node comprises a connecting node which connects the gate of the amplifying transistor, the other end of the current path of the read transistor, and the other end of the current path of the reset transistor.

16. A device according to claim 15, further comprising a row select transistor having a current path one end of which is connected to the power supply, and the other end of which is connected to the other end of the current path of the amplifying transistor, and having a gate to which an address pulse is supplied.

17. A device according to claim 1, wherein the wide dynamic range mixer circuit outputs a linearized sum signal.

* * * * *